(12) United States Patent
Matiss et al.

(10) Patent No.: US 11,973,580 B2
(45) Date of Patent: Apr. 30, 2024

(54) REDUNDANT WAVELENGTH DIVISION MULTIPLEXING DEVICES AND METHODS FOR PROCESSING LIGHT USING SAME

(71) Applicant: CORNING RESEARCH & DEVELOPMENT CORPORATION, Corning, NY (US)

(72) Inventors: Andreas Matiss, Berlin (DE); Eric Stephan ten Have, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/942,265

(22) Filed: Sep. 12, 2022

(65) Prior Publication Data
US 2023/0107512 A1 Apr. 6, 2023

Related U.S. Application Data

(60) Provisional application No. 63/250,305, filed on Sep. 30, 2021.

(51) Int. Cl.
*H04J 14/02* (2006.01)
(52) U.S. Cl.
CPC .................. *H04J 14/0278* (2013.01)
(58) Field of Classification Search
CPC .............. H04J 14/0278; G02B 6/2938; G02B 6/29365

See application file for complete search history.

(56) References Cited

U.S. PATENT DOCUMENTS

| | | | | |
|---|---|---|---|---|
| 5,583,683 A | * | 12/1996 | Scobey | G02B 6/29367 398/79 |
| 5,786,915 A | * | 7/1998 | Scobey | G02B 26/001 398/79 |
| 6,044,187 A | | 3/2000 | Duck et al. | |
| 6,167,171 A | * | 12/2000 | Grasis | G02B 6/29367 398/1 |
| 6,198,857 B1 | | 3/2001 | Grasis et al. | |
| 6,301,407 B1 | | 10/2001 | Donaldson | |

(Continued)

FOREIGN PATENT DOCUMENTS

| | | |
|---|---|---|
| CN | 102684794 A | 9/2012 |
| CN | 106094118 A | 11/2016 |

(Continued)

*Primary Examiner* — Jai M Lee
(74) *Attorney, Agent, or Firm* — Tamika A. Crawl-Bey

(57) ABSTRACT

A redundant wavelength division multiplexing (WDM) device including a first common port which includes a collimator configured to transmit a first optical beam. The first beam includes a first plurality of optical signals. A second common port includes a collimator configured to transmit a second optical beam that includes a second plurality of optical signals. The second common port is spaced apart from the first common port and a plurality of filters define an optical path for each of the first optical beam and the second optical beam. Each filter is oriented to interact with each of the first optical beam and the second optical beam. A method of processing light includes transmitting one of the first optical signals of a first wavelength through a first filter and transmitting one of the second optical signals of the first wavelength through the first filter.

3 Claims, 14 Drawing Sheets

(56) References Cited

U.S. PATENT DOCUMENTS

| | | | |
|---|---|---|---|
| 6,421,481 B1 | 7/2002 | Sappey | |
| 6,748,133 B2* | 6/2004 | Liu | G02B 6/2938 385/24 |
| 7,177,493 B2* | 2/2007 | McGuire, Jr. | G02B 6/356 385/11 |
| 7,486,891 B1* | 2/2009 | Yao | G02B 6/29365 398/79 |
| 7,843,644 B1 | 11/2010 | Wang et al. | |
| 7,912,374 B1* | 3/2011 | Wang | G02B 27/1006 398/85 |
| 8,351,791 B1 | 1/2013 | Wang et al. | |
| 9,401,773 B1 | 7/2016 | Gui et al. | |
| 9,551,833 B1 | 1/2017 | Li et al. | |
| 9,590,759 B1* | 3/2017 | Peng | H04J 14/0208 |
| 9,804,332 B1 | 10/2017 | Wang et al. | |
| 10,203,455 B2* | 2/2019 | Amit | H04B 10/506 |
| 10,313,045 B2 | 6/2019 | Xiao et al. | |
| 10,551,569 B2 | 2/2020 | Gui et al. | |
| 11,057,145 B2* | 7/2021 | Gui | H04J 14/0216 |
| 11,422,302 B1* | 8/2022 | Wu | G02B 6/04 |
| 11,460,641 B2* | 10/2022 | Huang | G02B 6/2938 |
| 11,474,299 B2* | 10/2022 | Gui | G02B 6/3514 |
| 2003/0099434 A1 | 5/2003 | Liu et al. | |
| 2004/0005115 A1 | 1/2004 | Luo et al. | |
| 2004/0076436 A1 | 4/2004 | Bergmann et al. | |
| 2008/0131128 A1 | 6/2008 | Ota | |
| 2009/0034971 A1 | 2/2009 | Sadanada | |
| 2010/0329678 A1 | 12/2010 | Wang et al. | |
| 2013/0330080 A1 | 12/2013 | Li et al. | |
| 2017/0054507 A1 | 2/2017 | Elahmadi et al. | |
| 2017/0093488 A1 | 3/2017 | Wang et al. | |
| 2017/0254958 A1 | 9/2017 | Yue | |
| 2017/0261691 A1* | 9/2017 | Yue | G02B 6/2938 |
| 2017/0269314 A1 | 9/2017 | Gaal | |
| 2017/0276889 A1 | 9/2017 | Baba et al. | |
| 2017/0285269 A1* | 10/2017 | Yue | G02B 6/32 |
| 2017/0307819 A1 | 10/2017 | Ho et al. | |
| 2018/0041280 A1 | 2/2018 | Elahmadi et al. | |
| 2018/0052289 A1 | 2/2018 | Lin et al. | |
| 2018/0059340 A1 | 3/2018 | Lin et al. | |
| 2018/0062756 A1 | 3/2018 | Ho et al. | |
| 2018/0139520 A1* | 5/2018 | Xiao | G02B 6/2938 |
| 2018/0172928 A1 | 6/2018 | Ho et al. | |
| 2018/0172933 A1 | 6/2018 | Noguchi | |
| 2018/0220208 A1* | 8/2018 | Gui | G02B 6/2938 |
| 2018/0284370 A1 | 10/2018 | Ho et al. | |
| 2019/0200104 A1* | 6/2019 | Xiao | H04J 14/0242 |
| 2021/0135775 A1* | 5/2021 | Xiao | G02B 6/2938 |
| 2021/0149117 A1* | 5/2021 | Gui | H04J 14/02 |
| 2022/0038201 A1* | 2/2022 | Xiao | H04J 14/02 |
| 2023/0010259 A1* | 1/2023 | Tanaka | G02B 6/29365 |
| 2023/0063431 A1* | 3/2023 | ten Have | H04B 10/25 |
| 2023/0168432 A1* | 6/2023 | Tanaka | G02B 6/2938 385/24 |

FOREIGN PATENT DOCUMENTS

| | | |
|---|---|---|
| EP | 0947865 A1 | 10/1999 |
| EP | 2963851 A1 | 1/2016 |
| WO | 2015/065459 A1 | 5/2015 |

* cited by examiner

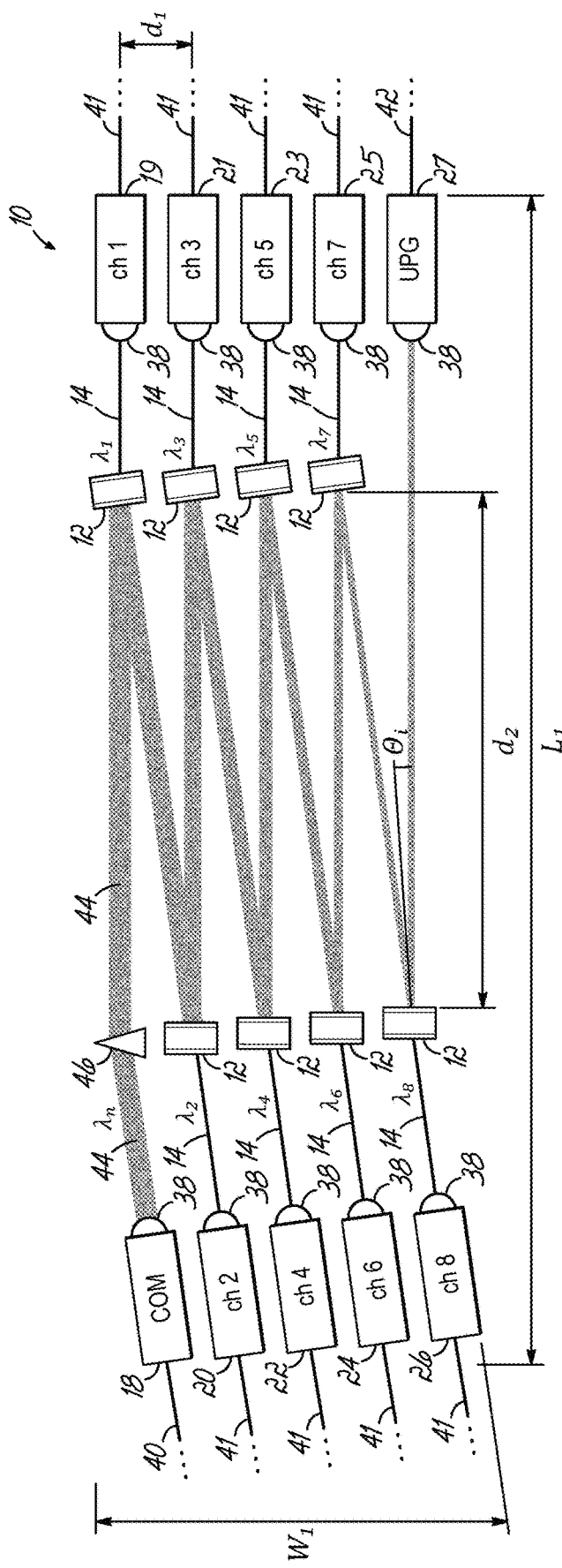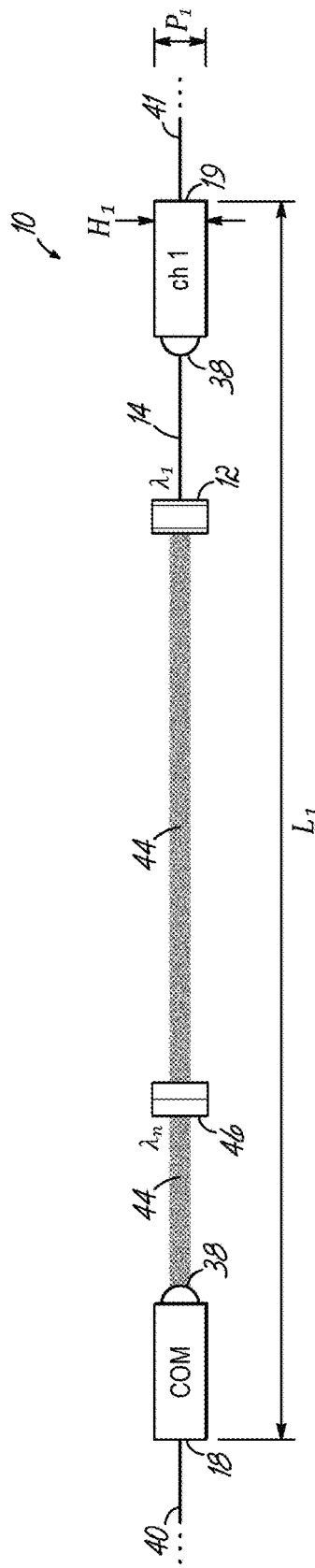
FIG. 1A
FIG. 1B

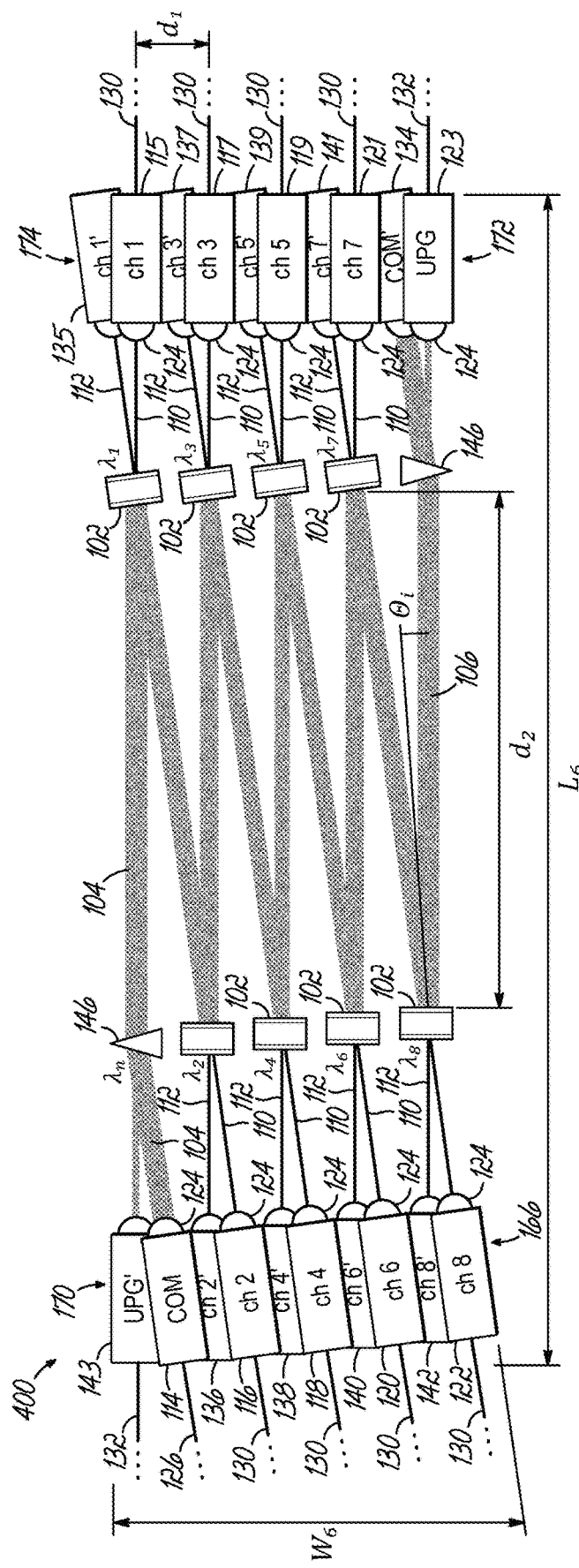
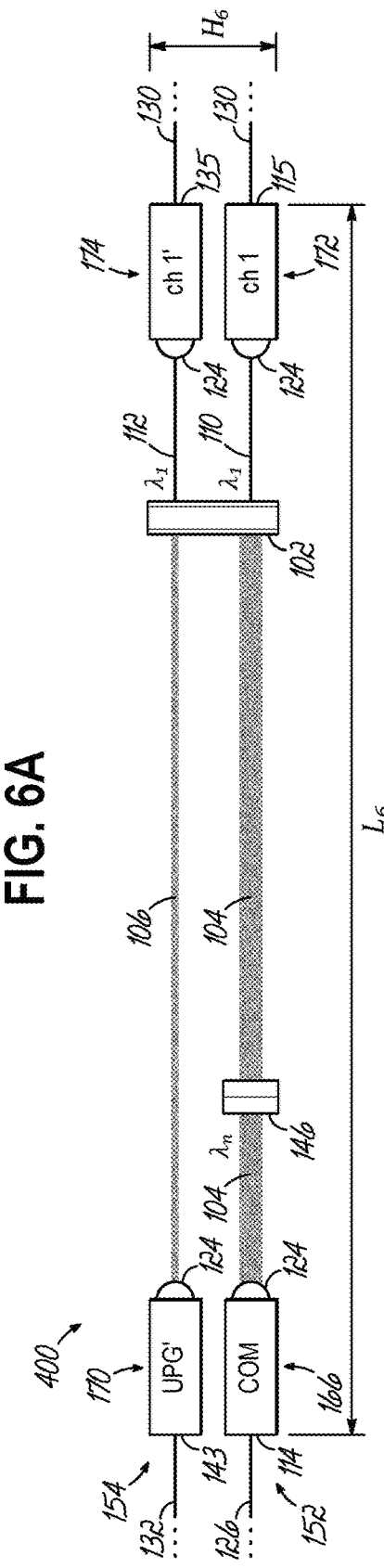
FIG. 6A
FIG. 6B

REDUNDANT WAVELENGTH DIVISION MULTIPLEXING DEVICES AND METHODS FOR PROCESSING LIGHT USING SAME

PRIORITY APPLICATION

This application claims the benefit of priority of U.S. Provisional Application No. 63/250,305, filed on Sep. 30, 2021, the content of which is relied upon and incorporated herein by reference in its entirety.

TECHNICAL FIELD

This disclosure relates generally to optical wavelength multiplexing, and more particularly to redundant wavelength multiplexing devices and to methods for processing light according to wavelength multiplexing.

BACKGROUND

Optical fibers are useful in a wide variety of applications, including the telecommunications industry for voice, video, and data transmissions. Benefits of optical fibers include wide bandwidth and low noise operation. However, the need to connect network nodes with fiber-optic cables often drives the cost of fiber-optic networks, especially for fiber-optic networks having a large geographic footprint.

One way to increase the bandwidth of existing fiber-optic networks while avoiding the need to lay additional fiber-optic cables is through Wavelength Division Multiplexing (WDM). WDM involves transmitting data with multiple optical signals in a single optical fiber. Each optical signal has a different wavelength from the other optical signals. The different optical signals provide different channels for data in the single optical fiber and may be referred to as "signal components" or "optical carriers" of a combined optical signal or "optical beam" carried by the optical fiber. The single optical fiber transmits the different optical signals simultaneously in the same direction. Because of their cost-effectiveness relative to laying additional fiber-optic cables to increase bandwidth, WDM applications are increasingly being deployed to address an increasing demand for bandwidth.

WDM systems require hardware to combine and separate the different optical signals at different locations in an optical network. Typically, this hardware includes a WDM device (referred to as a multiplexer) that combines the individual optical signals into the optical beam at one network location, and another WDM device (referred to as a demultiplexer) that splits the optical beam into the individual optical signals at another network location. WDM devices are often deployed in tightly confined spaces. Thus, it is desirable for the WDM devices to be as compact as possible.

Exemplary schematics of WDM devices are shown in FIGS. 1A and 1B and in FIGS. 2A and 2B. The exemplary WDM device 10 shown on FIGS. 1A and 1B uses a plurality of bandpass filters 12 to define an optical path for an optical beam 44. As shown, the optical beam 44 includes different optical signals 14 (i.e., n optical signals at different wavelengths, $\lambda_n$), which are separated from the optical beam 44 with the filters 12. In the device 10 of FIG. 1A, there are at least 8 different optical signals 14 represented by $\lambda_1$ through $\lambda_8$ in the optical beam 44 which are processed with the WDM device 10.

To that end, the WDM device 10 further includes a common port 18, a plurality of channel ports 19-26, an optional upgrade port (UPG) 27, and a plurality of collimators 38. An optical fiber 40 associated with the common port 18 carries the optical beam 44 into or from the WDM device 10. The optical fiber 40 may be referred to as a "common optical fiber." Optical fibers 41 associated with the channel ports 19-26 each carry one of the optical signals 14, that is, at least one of wavelengths $\lambda_1$ through $\lambda_8$ and may be referred to as a "channel optical fiber." And, an optical fiber 42 associated with the UPG 27 carries one or more optical signals 14 not associated with any of the channel ports 19-26. The exemplary WDM device 10 shown may be referred to as an 8-channel device.

Each of the eight filters 12 has a passband that passes a range of wavelengths that includes the wavelength $\lambda_n$ of a respective one of the optical signals 14 and excludes the wavelengths $\lambda_n$ of the other optical signals 14. In this way, each filter 12 transmits the optical signal 14 having the wavelength $\lambda_n$ that falls within its passband and reflects the optical signals 14 having wavelengths $\lambda_n$ that fall outside its passband. By arranging the filters 12 sequentially in the optical path, as shown, each filter 12 can: (a) separate one of the optical signals 14 from the optical beam 44 and provide it to a respective collimator 38 (demultiplexing application); and/or (b) add one of the optical signals 14 from the respective collimator 38 to the optical beam 44. The WDM device 10 is bi-directional. In other words, the device 10 can split optical signals 14 received from the optical beam 44 for distribution at a network location, and the device 10 can combine optical signals 14 to the optical beam 44 for transmission into the optical fiber 40 at a network location. Thus, the WDM device 10 can be used as a multiplexer, demultiplexer, or both a multiplexer and demultiplexer.

The external size of a WDM device depends on internal spacing as well as the physical size of the filters 12 and ports 18-27. Internal spacing of the filters 12 and ports 18-27 is largely determined by (i) a lateral distance $d_1$ between centerlines of adjacent ports 19-27 (e.g., the distance between the centerline of port 19 and port 21, as shown) or between adjacent filters 12 and (ii) the angle of incidence $\theta_i$ of the optical beam 44 on the filters 12. The angle of incidence $\theta_i$ is determined by the nature of the filter 12, for example, a coating on the filer 12. The angle of incidence $\theta_i$ may be chosen to match certain values of the spacing between adjacent filters 12, which may be related to the lateral distance $d_1$. Typical angles of incidence $\theta_i$ are 1.8° and 4° for Dense Wavelength Division Multiplexing (DWDM) applications and 13.5° for Coarse Wavelength Division Multiplexing (CWDM).

These internal values $d_1$, $d_2$, and $\theta_i$ effect the outer dimensions of the device 10. For example, a width $W_1$ of the device 10 is dependent on the lateral distance $d_1$ and the number of ports 18-27. A length $L_1$ of the WDM device 10 is dependent on the transverse distance $d_2$, which is itself dependent on the angle of incidence $\theta_i$ and transverse distance $d_1$. Outer dimensions are also dependent on physical dimensions of the ports 18-27.

In FIGS. 1A and 1B, the WDM device 10 has an angle of incidence $\theta_i$ of 4°. An exemplary lateral distance $d_1$ is 2.5 mm to allow sufficient spacing between adjacent ports 18-27 or to allow sufficient spacing between adjacent filters 12, and an exemplary transverse distance $d_2$ is 17.2 mm. The physical dimensions of the ports 18-27 and/or filters 12 influence the outer dimensions of the WDM device 10. As shown, a size (e.g., diameter), $P_1$, of the ports 18-27 may be 1.5 mm. With each of $d_1$, $d_2$, $\theta_i$, and $P_1$ for an 8-channel WDM device 10, the device length $L_1$ is 44 mm. The width $W_1$ is 13 mm (e.g., with a prism 46 between the collimator 38 and the filter 12 proximate common port 18). With reference specifically to FIG. 1B, a height $H_1$ of the WDM device 10 is equal to $P_1$ (e.g., 1.5 mm), which is the diameter of the collimator 38. These dimensions of length $L_1$, $W_1$, and $H_1$ do not include a strain relief for the optical fibers 40-42 or a housing for the WDM device 10, which will add a few millimeters in all directions. By changing any of these dimensions, distances, or angles, the dimensions of the WDM device may be modified within certain limits.

For example, another WDM device 50 is shown in FIGS. 2A and 2B and includes a prism 52 by which some of the optical signals 14 are folded. The prism 52 is in an optical path between channels 1, 3, 5, and 7, etc. and the corresponding filter 12. The prism 52 refracts the optical signals 14. This is shown best in FIG. 2B. The prism 52 folds the optical signals 14 from a first layer 54 to a second layer 56 in which channel ports 19, 21, 23, 25, and 27 (e.g., channel 1, 3, 5, 7, and UPG shown in phantom line in FIG. 2A) and associated collimators 38 reside. By folding the optical signals 14, the dimensions of the WDM device 50 are changed. In this case, the length L is reduced relative to the WDM device 10 of FIGS. 1A and 1B, and the height H is increased relative to the WDM device 10 of FIGS. 1A and 1B.

In that regard, when FIGS. 2A and 2B are compared to FIGS. 1A and 1B, a width $W_2$ of 13 mm of the WDM device 50 remains the same as the width $W_1$ of 13 mm of the WDM device 10. A length, $L_2$, of the WDM device 50 is reduced to 37 mm relative to $L_1$ of 44 mm of the WDM device 10 due to the rearrangement of the ports 19, 21, 23, 25, and UPG 27 to the second layer 56. A height $H_2$ of 4 mm of the WDM device 50 is increased (due to the two-layer construction) relative to the height $H_1$ of 1.5 mm of the WDM device 10. The dimensional changes are based solely on rearrangement of the ports and filters. That is, the dimensions of the ports and filter remain the same. For comparison, the WDM device 10 of FIGS. 1A and 1B has a footprint ($L_1$ by $W_1$) of 572 $mm^2$. The WDM device 50 of FIGS. 2A and 2B has a footprint ($L_2$ by $W_2$) of 481 $mm^2$. Thus, it is possible to a limited degree to make these devices compact in one or more dimensions to fit the space available by rearrangement of the ports and filters.

While these devices have successfully increased the bandwidth of existing fiber-optic networks, there is concurrent demand for improving the quality of service. From a hardware standpoint, this includes limiting service interruptions. What is needed in the fiber optics industry then is redundancy in existing networks including providing redundancy at multiplexing/demultiplexing locations.

SUMMARY

A redundant wavelength division multiplexing (WDM) device includes a first common port having a collimator configured to transmit a first optical beam. The first optical beam includes a first plurality of optical signals each having a different wavelength. The redundant WDM device includes a second common port having a collimator configured to transmit a second optical beam. The second optical beam includes a second plurality of optical signals each having a different wavelength. The second common port is spaced apart from the first common port. The redundant WDM device includes a plurality of filters that define an optical path for each of the first optical beam and the second optical beam. Each filter is oriented to interact with each of the first optical beam and the second optical beam. In this way, the same plurality of filters may be configured to be used by both optical beams.

In one embodiment, the redundant WDM device further includes a plurality of first channel ports and a plurality of second channel ports. Each channel port includes a respective channel collimator. In the redundant WDM device, a sum of a number of the first channel ports and a number of the second channel ports is equal to twice a number of the filters.

In one embodiment, the redundant WDM device further includes a prism between at least one of the first common port and one of the filters and the second common port and one of the filters.

In one embodiment, the first common port and the second common port are adjacent one another in a column and together define a plane. Each of the filters of the plurality of filters has a longitudinal axis and the longitudinal axes reside in the plane.

In one embodiment, the first common port and the second common port define a first plane and a second plane, respectively, the first plane being spaced apart from the second plane. Each of the filters has a longitudinal axis and the longitudinal axes are perpendicular to each of the first plane and the second plane. In this embodiment, the first common port and the second common port are side-by-side and each channel port is associated with a respective filter of the plurality of filters.

In one embodiment, one-half of the first channel ports and one-half of the second channel ports form a first column in which the first channel ports are interleaved with the second channel ports. A prism is positioned optically between each of the filters and the first column and is configured to refract the first plurality of optical signals and the second plurality of optical signals. The first column defines a first layer and one-half of the first channel ports, and one-half of the second channel ports form a second column in which the first channel ports are interleaved with the second channel ports, and the second column defines a second layer spaced apart from the first layer. A second prism is positioned optically between each of the filters and the second column and is configured to refract the first plurality of optical signals and the second plurality of optical signals. The plurality of filters defines a third layer and the third layer is spaced apart and between the first layer and the second layer.

In one embodiment, one-half of the first channel ports forms a first column and one-half of the second channel ports forms a second column, the first column defining a first plane and the second column defining a second plane spaced apart from the first plane. One-half of the first channel ports forms a third column and one-half of the second channel ports forms a fourth column. The third column defines a third plane, and the fourth column defines a fourth plane. The third plane is spaced apart from the fourth plane.

In one embodiment, one-half of the first channel ports forms a third column and one-half of the second channel ports forms a fourth column, the first column and the third column residing in the first plane, and the second column and the fourth column residing in the second plane. A prism is positioned optically between the plurality of filters and the second column.

A method of processing light in a wavelength division multiplexing device includes transmitting, by a collimator of a first common port, a first optical beam including a first plurality of optical signals. Each optical signal of the first plurality of optical signals includes a different wavelength. The method further includes transmitting, by a collimator of a second common port, a second optical beam including a second plurality of optical signals. Each optical signal of the second plurality of optical signals includes a different wavelength. The different wavelengths of the first plurality of optical signal are the same as the different wavelengths of the second plurality of optical signals. The method further includes receiving the first optical beam and the second optical beam at a first filter of a plurality of filters, wherein the plurality of filters defines an optical path for the first optical beam and for the second optical beam, and transmitting one of the first optical signals of a first wavelength through the first filter and transmitting one of the second optical signals of the first wavelength through the first filter. In accordance with the method, transmitting one of the first optical signals and transmitting one of the second optical signals is simultaneous.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIGS. 1A and 1B are schematic plan and elevation views, respectively, of a wavelength division multiplexing (WDM) device;

FIGS. 6A and 6B are schematic plan and elevation views, respectively, of an exemplary redundant WDM device in accordance with one embodiment of the disclosure;

DETAILED DESCRIPTION

With reference to FIGS. 3A-9B, a redundant wavelength division multiplexing (WDM) device according to embodiments of the disclosure provides redundancy in multiplexing and in demultiplexing while being more compact than duplicating either of the WDM devices 10, 50 of FIGS. 1A-2B to provide redundancy of operation. In other words, one arrangement to provide redundancy is to duplicate the WDM devices 10 and 50, such as by placing two of the devices 10 or two of the devices 50 side-by-side. However, a problem with duplication of these devices is the lack of space available for multiple WDM devices 10 and 50 at network locations. Embodiments of the redundant WDM device according to the disclosure are more compact than any two of the WDM devices 10, 50 side-by-side and are configured to fit into locations with similar space restrictions, described above. The WDM device according to embodiments of the disclosure provides redundancy to processing of an optical beam without duplication of the devices 10 and 50 and thus provides a solution to overcome the identified space restrictions at network locations.

With continued reference to FIGS. 3A-9B, embodiments of the redundant WDM device simultaneously process two optical beams in parallel. The redundant WDM device includes a plurality of filters. Each filter simultaneously receives each of the two optical beams. There is thus a two-to-one relationship between the optical beams and filters. For example, in demultiplexing, each filter receives two optical beams and passes two optical signals. Reducing the number of filters by half is advantageous. While this results in a reduction in the number of components in the WDM device relative to duplication of the devices 10, 50, the filters are increased in size. With an increase in filter size, the surface quality of the filters is improved. This may be observed in the reduction of edge effects due to chipping. Also, an increase in size of the filters and a reduction in their number simplifies handling and assembly but reduces the size of the WDM device as is described herein. Thus, the redundant WDM devices of the disclosure are more compact than a duplication of device 10 or 50. Further, it is believed that an assembly process of the WDM devices of the disclosure will have a higher yield in view of the simplification in their assembly.

Figure 2A:
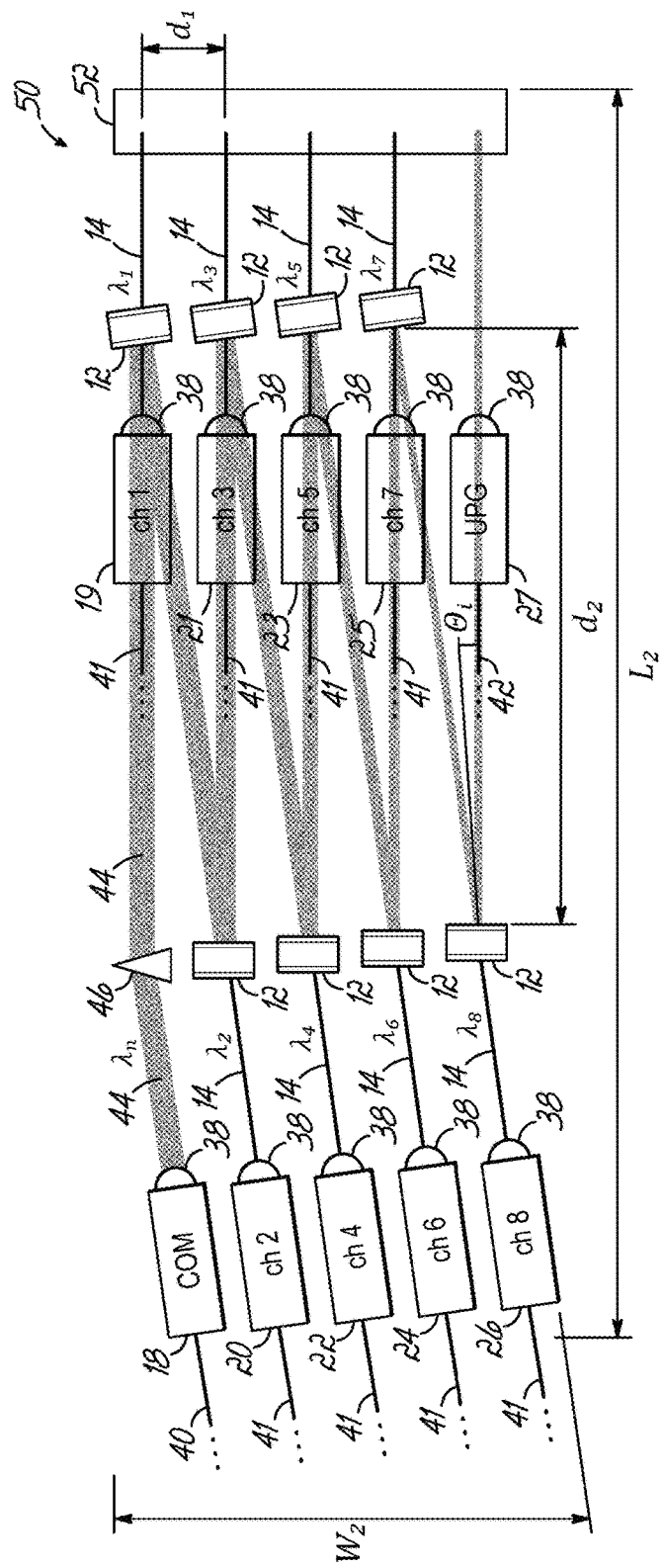
FIGS. 2A and 2B are schematic plan and elevation views, respectively, of a wavelength division multiplexing (WDM) device in which an optical beam is folded.
Figure 2B:
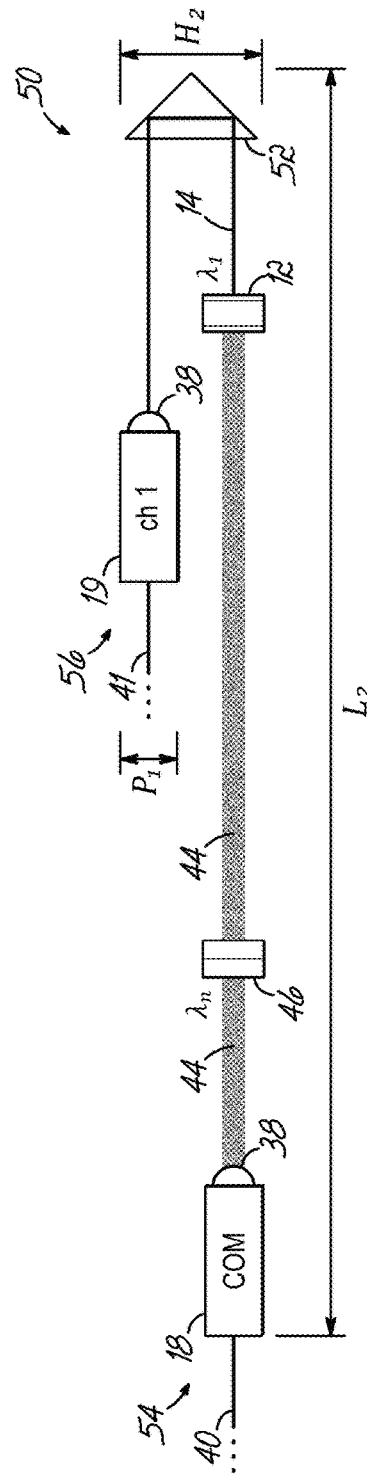
Figure 3A:
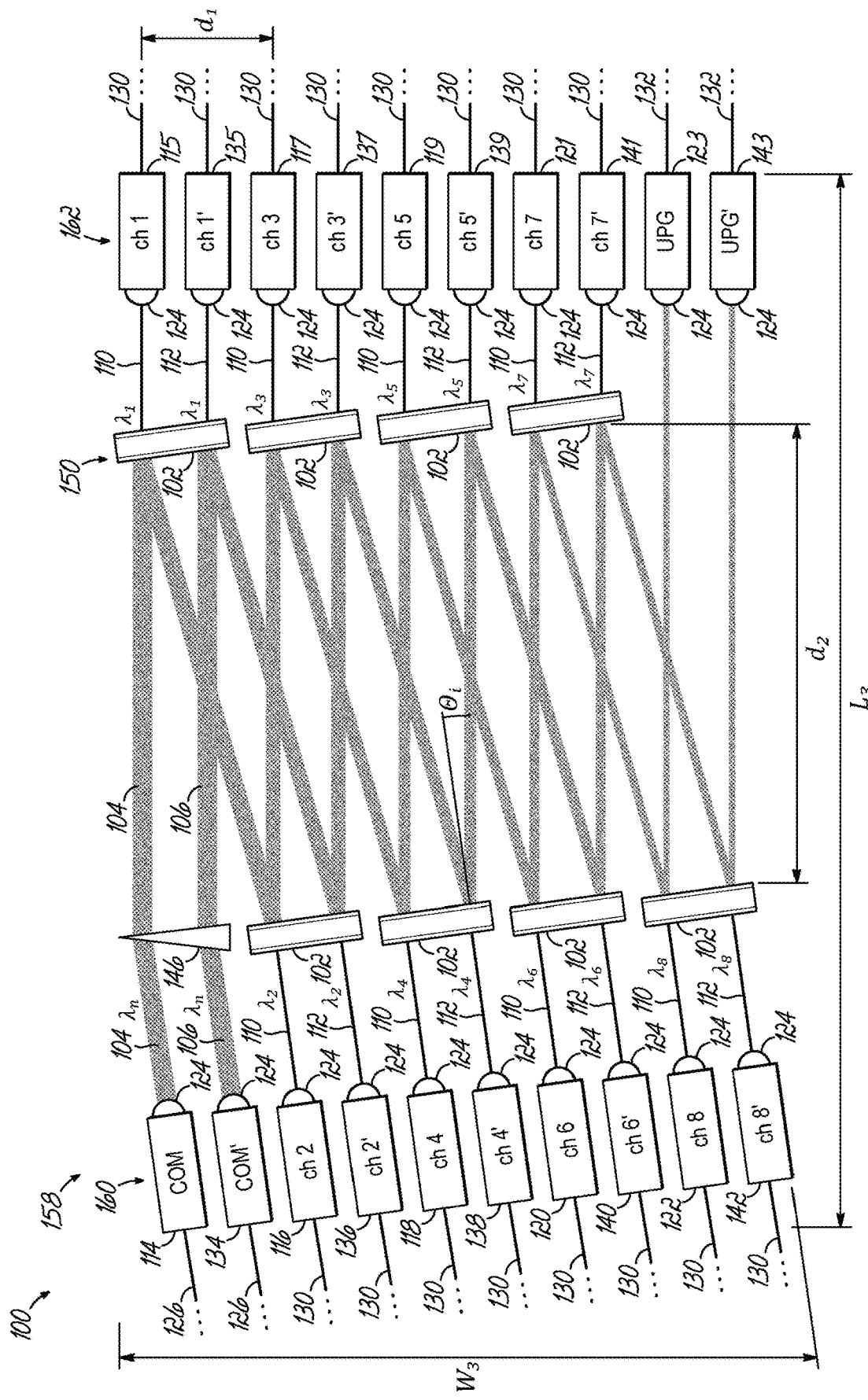
FIGS. 3A and 3B are schematic plan and elevation views, respectively, of an exemplary redundant WDM device in accordance with one embodiment of the disclosure.
Figure 3B:
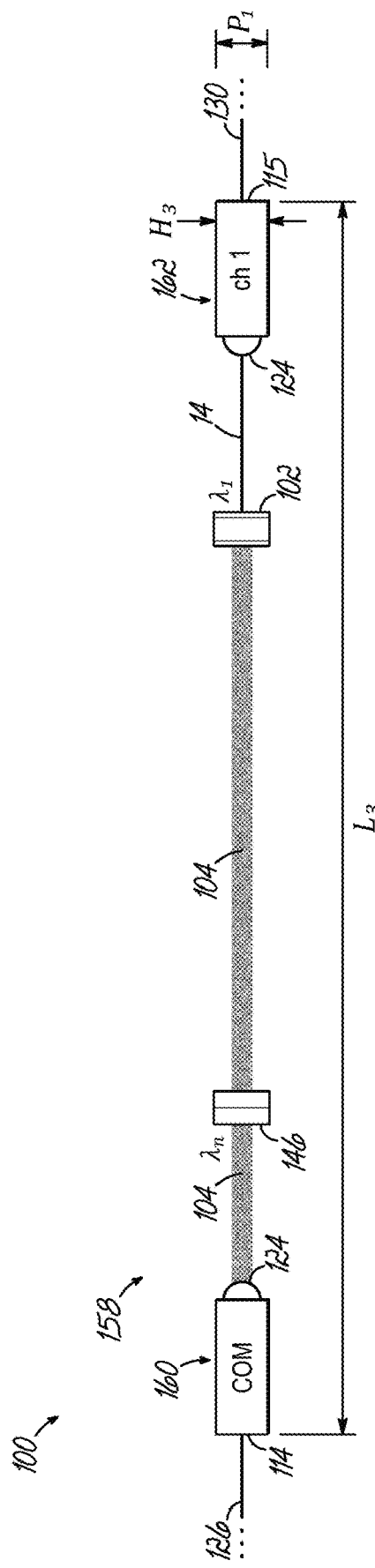

As shown in FIGS. 3A and 3B, in one embodiment of the disclosure, a redundant WDM device 100 includes a plurality of bandpass filters 102 to define a first optical path for a first optical beam 104. The plurality of bandpass filters 102 also defines a second optical path for a second optical beam 106. In other words, the filters 102 define two separate, though parallel, optical paths. The redundant WDM device 100 is configured to process each of the optical beams 104 and 106 simultaneously. The optical beams 104 and 106 co-propagate along their respective paths in parallel in the WDM device 100.

In that regard, the first optical beam 104 includes a plurality of different optical signals 110. The optical beam 104 include n optical signals at different wavelengths, $\lambda_n$. In the WDM device 100 of FIG. 3A, there are at least 8 different optical signals 110 represented by $\lambda_1$ through $\lambda_8$ in the first optical beam 104. There are an equivalent number of optical signals 112 in the second optical beam 106. For example, the optical signals 112 are represented by wavelengths $\lambda_1$ through $\lambda_8$. In demultiplexing, for example, though the optical beams 104 and 106 are different, spaced apart beams, the optical signals 110 and 112 from a respective one of the filters 102 are the same wavelength $\lambda_n$. As a result, from each filter 102, two optical signals 110 and 112 of the same wavelength $\lambda_n$ are passed. For example, as shown in FIG. 3A, the optical beam 104 impinges on the filter 150 which permits the optical signal 110 of wavelength $\lambda_1$ to pass. The optical beam 106 also impinges on the filter 150 which permits the optical signal 112 of wavelength $\lambda_1$ to pass. So, the filter 150 has a bandpass which permits the same wavelength $\lambda_1$ of each of the beams 104 and 106 to pass through the filter 150.

While having a two-to-one ratio of optical beams 104 and 106 to filters 102, the WDM device 100 duplicates channel ports and optical fibers. In the embodiments shown, there are twice as many ports and optical fibers as there are filters 102. In that regard, the redundant WDM device 100 includes a common port 114, a plurality of channel ports 115-122 (i.e., channels 1-8), an optional upgrade port (UPG) 123, and a plurality of collimators 124. An optional tap port (TAP) (not shown) for monitoring one or more of the optical signals 110, 112 may also be included. An optical fiber 126 is associated with the common port 114 and carries the first optical beam 104. Optical fibers 130 associated with the channel ports 115-122 each carry one of the optical signals 110, that is, at least one of wavelengths $\lambda_i$ through $\lambda_8$. And, an optical fiber 132 associated with the UPG 123 carries one or more optical signals not associated with any of the channel ports 115-122.

The redundant WDM device 100 includes a second set of ports for processing the second optical beam 106. As shown, the WDM device 100 includes a second common port 134, a second plurality of channel ports 135-142 (i.e., redundant channels 1'-8'), a second optional upgrade port (UPG') 143, and a second plurality of collimators 124. The optical fiber 126 associated with the common port 134 carries the second optical beam 106 and so carries all optical signals 112. Additional optical fibers 130 associated with the channel ports 135-142 each carry one of the optical signals 112, that is, at least one of wavelengths $\lambda_1$ through $\lambda_8$ as determined by the filters 102. And, the optical fiber 132 associated with the UPG' 143 carries one or more optical signals not associated with any of the channel ports 135-142. With this design, the exemplary WDM device 100 is a redundant 8-channel device.

In the redundant 8-channel WDM device 100, at least one set of ports 114, 116, 118, 120, 122, 134, 136, 138, 140, 142 (i.e., COM, COM', ch 2, ch 2', ch 4, ch 4', ch 6, ch 6', ch 8, ch 8') (shown on the left of FIG. 3A) opposes another set of channel ports 115, 117, 119, 121, 123, 135, 137, 139, 141, and 143 (i.e., ch 1, ch 1', ch 3, ch 3', ch 5, ch 5', ch 7, ch 7', UPG, UPG') (shown on the right side of FIG. 3A). The arrangement of the channel ports 114-123 and channel ports 134-143 define a single layer 158 (as indicated in FIG. 3B). The channel ports 114, 116, 118, 120, 122 for the first optical beam 104 alternate in an interleaved, stacked configuration in layer 158 with corresponding redundant channel ports 134, 136, 138, 140, 142 for the second optical beam 106. In that regard, channel ports 114, 116, 118, 120, 122, 134, 136, 138, 140, 142 (i.e., COM, COM', ch 2, ch 2', ch 4, ch 4', ch 6, ch 6', ch 8, ch 8') form a column 160 in the layer 158. Similarly, the channel ports 115, 117, 119, 121, and 123 alternate in an interleaved, stacked configuration with a second set of redundant channel ports 135, 137, 139, 141, and 143 to form a separate column 162 in the layer 158. The column 160 and column 162 are spaced apart by the filters 102. As shown, the number of channel ports 115-122, 135-142 is 16 (one for each optical signal 110 and 112) and the number of filters 102 is 8.

The filters 102 are oriented with a longitudinal axis in the plane of the single layer 158. Further in that regard, each of the filters 102 has a passband that passes a range of wavelengths that includes the wavelength $\lambda_n$ of a respective one of the optical signals 110 and excludes the wavelengths $\lambda_n$ of the other optical signals 110 of the first optical beam 104. The filter 102 operates in the same manner with respect to the second optical beam 106. That is, each of the filters 102 has a passband that passes a range of wavelengths that includes the wavelength $\lambda_n$ of a respective one of the optical signals 112 of the second optical beam 106 and excludes the wavelengths $\lambda_n$ of the other optical signals 112 of the second optical beam 106.

By arranging the filters 102 sequentially in the optical path, as shown, each filter 102 can: (a) separate one of the optical signals 110 and 112 from each of a respective optical beam 104 and 106 and provide it to the respective collimator 124 (demultiplexing application); and/or (b) add each of the optical signals 110 and 112 from the respective collimator 124 to a corresponding optical beam 104 and 106. The WDM device 100 is bi-directional, meaning that the device 100 can both split optical signals 110, 112 received from the respective optical beam 104, 106 for distribution at a network location, and combine optical signals 110, 112 to the respective optical beam 104, 106 for transmission into the optical fiber 126 at a network location. Thus, the redundant WDM device 100 can be used as a multiplexer, demultiplexer, or both a multiplexer and demultiplexer.

The compactness of the WDM device 100 depends on internal spacing as well as the physical size of the filters 102 and ports 114-123 and 134-143. Internal spacing of the WDM device 100 is determined by a lateral distance $d_1$ between centerlines of adjacent ports receiving optical signals from the same optical beam. For example, with reference to FIG. 3A, the lateral distance $d_1$ is measured between centerlines of port 115 and port 117 (i.e., ch 1 and ch 3). This lateral distance $d_1$ includes physical space between the ports 115, 135, and 117. Alternatively, the lateral distance $d_1$ may depend on the dimension of the filter 102 plus spacing between adjacent filters 102.

In one embodiment, the filters 102 are larger in at least one dimension than the filters 12 shown in FIGS. 1A, 1B, 2A, and 2B. The enlarged filters 102 provide sufficient surface area for both optical beams 104 and 106 to simultaneously impinge upon the filter 102 at an angle of incidence $\theta_i$. By way of example, the filters 102 may be twice as large in one dimension than filters 12 and so may be 2.5 mm to 3.5 mm in one dimension. As shown, the values of $\theta_i$ and $d_1$ define the transverse distance $d_2$ between adjacent filters 102 in the optical beams 104, 106 according to the principles of trigonometry. Angles of incidence $\theta_i$ may range from 1.8° to 4° for Dense Wavelength Division Multiplexing (DWDM) applications and up to 13.5° for Coarse Wavelength Division Multiplexing (CWDM). A larger angle of incidence $\theta_i$ may result in a smaller relative transverse distance $d_2$ of the WDM device 100.

The internal values $d_1$, $d_2$, and $\theta_i$ with respect to the WDM device 100 of FIGS. 3A and 3B and physical dimensions of the ports 114-123 and ports 134-143 effect the outer dimensions of the device 100. In FIGS. 3A and 3B, the WDM device 100 has an angle of incidence $\theta_i$ of 4°. An exemplary lateral distance $d_1$ is 3.9 mm to allow sufficient spacing between adjacent ports 114-123 and 134-143 or to allow sufficient spacing (e.g., for assembly purposes) between adjacent filters 102. An exemplary transverse distance $d_2$ is 27.5 mm. As shown, a size (e.g., diameter), $P_1$, of the ports 114-123 and 134-143 may be 1.5 mm (i.e., the same dimension provided for ports 18-27 of FIGS. 1A-2B). This may also represent one dimension of the filter 102 shown in the view of FIG. 3B.

With each of $d_1$, $d_2$, $\theta_i$, and $P_1$, for the redundant 8-channel WDM device 100 shown in FIG. 3A, the device length $L_3$ is 55 mm. The width $W_3$ is 18 mm (e.g., with a prism 146 in an optical path between the collimator 124 and the filter 102 proximate common ports 114 and 134). With reference specifically to FIG. 3B, a height $H_3$ of the WDM device 100 is equal to $P_1$ (e.g., 1.5 mm). The footprint of the redundant WDM device 100 is 900 mm² which is more compact than two of the devices 10 shown in FIGS. 1A and 1B, which total 1144 mm². This amounts to a reduction in the footprint of about 13%. Further, the redundant WDM device 100 will have a reduced volume relative to two of the devices 10 shown in FIGS. 1A and 1B stacked one on top of the other. So, the redundant WDM device 100 is advantageous in space saving in a reduced footprint and reduced volume relative to two devices 10.

The dimensions of length $L_3$, $W_3$, and $H_3$ are summarized in one of the lines in Table 1, at the end of this section of the disclosure, and do not include a strain relief for the optical fibers 126, 130, and 132 or a housing for the redundant WDM device 100, which will add a few millimeters in all directions. While exemplary dimensions are provided for a redundant 8-channel WDM device 100, the dimensions $L_3$ and $H_3$ remain substantially the same for devices having more or fewer channels than 8 channels. The width dimension $W_3$ will increase or decrease with an increase or decrease, respectively, in the number of channel ports of the device. Exemplary 12 channel and 24 channel device dimensions for a 1-layer alternating stacked arrangement (similar to the WDM device 100) are listed in Table 2 at the end of this section of the disclosure. Thus, embodiments of the disclosure are not limited by the number of channel ports alone.

Figure 4A:
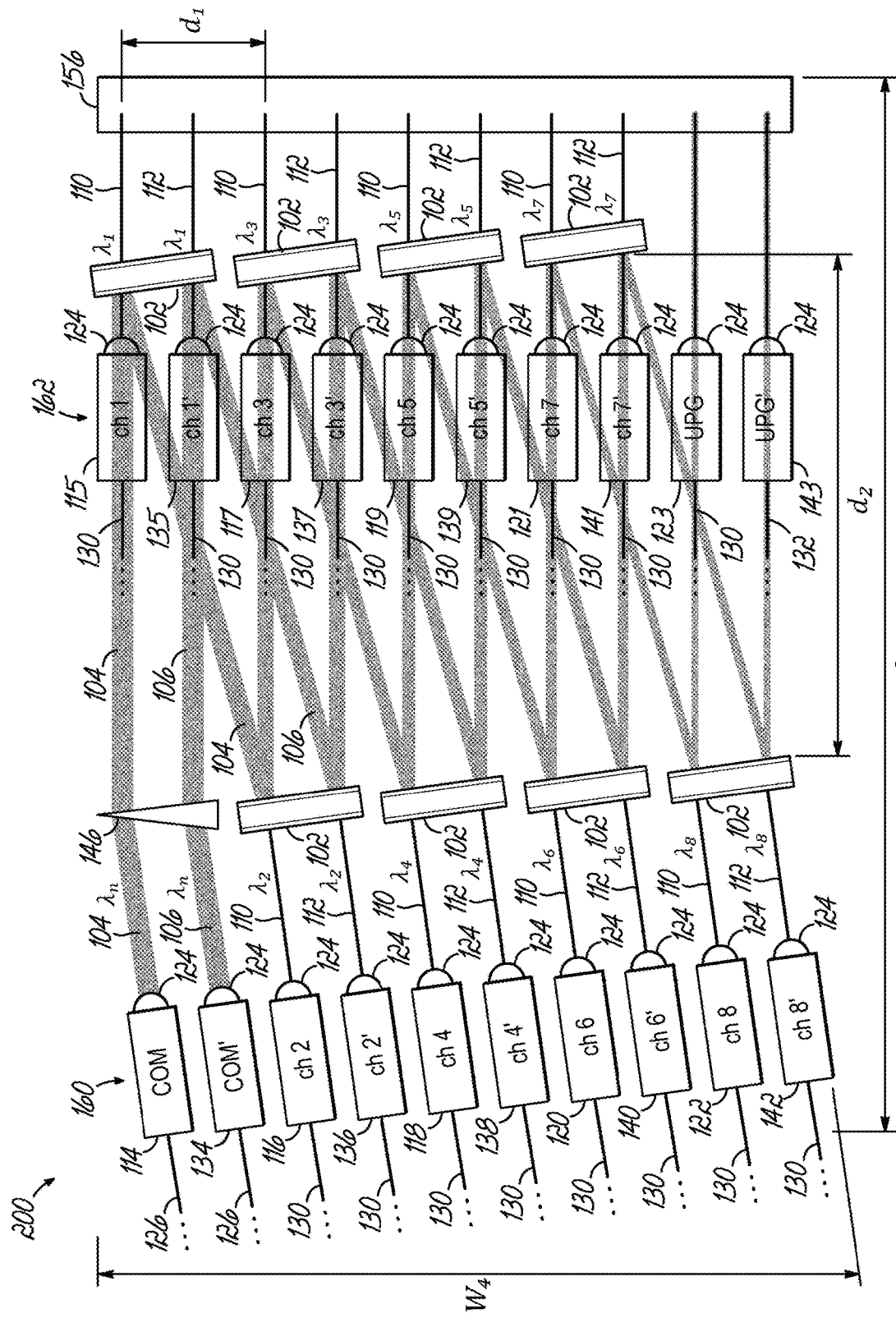
FIGS. 4A and 4B are schematic plan and elevation views, respectively, of an exemplary redundant WDM device in accordance with one embodiment of the disclosure.
Figure 4B:
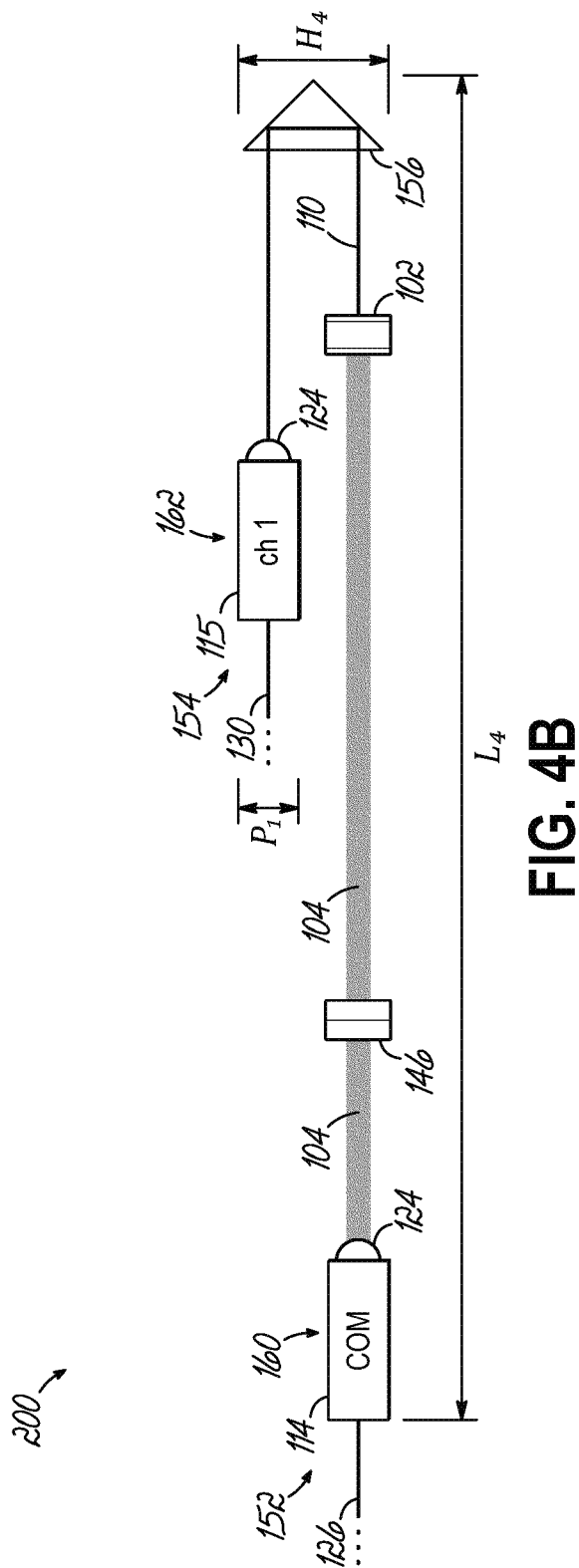

With reference to FIGS. 4A and 4B in which like reference numerals refer to like elements of FIGS. 3A and 3B, in one embodiment of the disclosure, a redundant WDM device 200 uses the plurality of bandpass filters 102 to define the first optical path for the first optical beam 104 and the second optical path for the second optical beam 106 in the same manner as the optical paths shown in FIGS. 3A and 3B. In other words, the filters 102 define two separate, though parallel, optical paths.

In that regard, the first optical beam 104 includes a plurality of different optical signals 110. In the WDM device 200 of FIG. 4A, there are at least 8 different optical signals 110 represented by $\lambda_1$ through $\lambda_8$ in the first optical beam 104. There are also at least 8 different optical signals 112 in the second optical beam 106 also represented by $\lambda_1$ through $\lambda_8$. Though the optical beams 104 and 106 are different, spaced apart beams, the optical signals 110 and 112 from a respective one of the filters 102 are the same wavelength $\lambda_n$. In demultiplexing, for example, from each filter 102, two optical signals 110 and 112 of the same wavelength $\lambda_n$ are passed from the separate optical beams 104 and 106.

As shown, the redundant WDM device 200 is a two-layer design with a first layer 152 being situated adjacent a second layer 154. This is shown best in FIG. 4B. Like the WDM device 100, the WDM device 200 is bi-directional. Thus, the redundant WDM device 200 can be used as a multiplexer, demultiplexer, or both a multiplexer and demultiplexer. Similar to the WDM device 100 of FIGS. 3A and 3B, the exemplary WDM device 200 of FIGS. 4A and 4B processes each of the optical beams 104 and 106 simultaneously. The optical beams 104 and 106 co-propagate in the WDM device 200.

In the 8-channel redundant WDM device 200, with the two layers 152 and 154, at least one set of ports 114, 116, 118, 120, 122, 134, 136, 138, 140, 142 (i.e., COM, COM', ch 2, ch 2', ch 4, ch 4', ch 6, ch 6', ch 8, ch 8' on the left side of FIG. 4A) resides in the first layer 152. At least one set of ports 115, 117, 119, 121, 123, 135, 137, 139, 141, and 143 (i.e., ch 1, ch 1', ch 3, ch 3', ch 5, ch 5', ch 7, ch 7', UPG, UPG' on the right side of FIG. 4A) resides in the second layer 154 (as indicated in FIG. 4B). An optional tap port (TAP) (not shown) for monitoring one or more of the optical signals 110, 112 may also be included.

The ports 114, 116, 118, 120, 122 for the first optical beam 104 alternate in an interleaved, stacked configuration in layer 152 with a second set of channel ports 134, 136, 138, 140, 142 for the second optical beam 106. In that regard, the COM port 114 and the even channel ports 116, 118, 120, 122 for optical signals 110 in the first optical beam 104 are stacked in an alternating manner in a column 160 with the COM' port 134 and redundant even channel ports 136, 138, 140, 142 for optical signals 112 in the second optical beam 106. As shown in FIG. 4B, the filters 102 reside in the first layer 152.

Similarly, in the second layer 154, the ports 115, 117, 119, 121, and 123 for the first optical beam 104 alternate in an interleaved, stacked configuration with a second set of channel ports 135, 137, 139, 141, and 143 for the second optical beam 106 in a column 162. Specifically, the odd ports 115, 117, 119, 121, and 123 for optical signals 110 in the first optical beam 104 are stacked in an alternating manner in the column 162 with the UPG port 123 and odd redundant ports 135, 137, 139, 141, and 143 for optical signals 112 in the second optical beam 106. In the embodiment shown, the filters 102 are oriented with a longitudinal axis in the plane of the first layer 152. As shown, the number of channel ports is 16 (one channel port for each optical signal 110 and 112) and number of filters is 8.

In addition, the two-layer design, with first and second layers 152, 154, is enabled by a prism 156 that spans nearly a width $W_4$ of the WDM device 200 and refracts all the optical signals 110 and 112 by 180° between the first layer 152 and the second layer 154. While the prism 156 is shown between the filters 102 and the ports 115, 117, 119, 121, 123, 135, 137, 139, 141, and 143, the prism 156 may be in an optical path between filters 102 in the optical beams 104 and 106, or in an optical path between the ports 114, 116, 118, 120, 122, 134, 136, 138, 140, 142 and the filters 102. While a prism 156 is shown and described, other devices, such as a mirror, may be utilized to fold the beams/signals. Thus, embodiments of the disclosure are not limited to use of prisms.

The compactness of the WDM device 200 depends on internal spacing as well as the physical size of the filters 102 and ports 114-123 and 134-143. Internal spacing of the WDM device 200 is determined by a lateral distance $d_1$ between centerlines of adjacent ports receiving optical signals from the same optical beam. For example, with reference to FIG. 4A, the lateral distance $d_1$ is measured between centerlines of port 115 and port 117 (i.e., ch 1 and ch 3). This lateral distance $d_1$ includes physical space between the ports 115, 135, and 117. Alternatively, the lateral distance $d_1$ may depend on the dimension of the filter 102 plus spacing between adjacent filters 102. The filters 102 may be larger in at least one dimension than the filters 12 shown in FIGS. 1A, 1B, 2A, and 2B so that there is sufficient surface area for both the optical beams 104 and 106 to simultaneously impinge upon the filter 102 at an angle of incidence $\theta_i$. By way of example, the filters 102 may be twice as large in one dimension than filters 12 and so may be 2.5 mm to 3.5 mm in one dimension. The values of $\theta_i$ and $d_1$ define the transverse distance $d_2$ between adjacent filters 102 in the optical beams 104, 106 according to the principles of trigonometry.

The internal values $d_1$, $d_2$, and $\theta_i$ with respect to the WDM device 200 of FIGS. 4A and 4B effect the outer dimensions of the device 200. For example, the width $W_4$ of the device 200 is dependent on the lateral distance $d_1$ and the number of ports 114-123 and 134-143. A length $L_4$ of the WDM device 200 is dependent on the transverse distance $d_2$, which is itself dependent on the angle of incidence $\theta_i$ and transverse distance $d_1$. Outer dimensions are also dependent on physical dimensions of the ports 114-123 and ports 134-143.

In FIGS. 4A and 4B, the WDM device 200 has an angle of incidence $\theta_i$ of 4°. An exemplary lateral distance $d_1$ is 3.9 mm to allow sufficient spacing between adjacent ports 114-123 and 134-143 or to allow sufficient spacing (e.g., for assembly purposes) between adjacent filters 102. An exemplary transverse distance $d_2$ is 27.5 mm. As shown, a size (e.g., diameter), $P_1$, of the ports 114-123 and 134-143 may be 1.5 mm. This may also represent one dimension of the filter 102 as shown in FIG. 4B. With each of $d_1$, $d_2$, $\theta_i$, and $P_1$, for the redundant eight channel WDM device 200 shown in FIG. 4A, the device length $L_4$ is 48 mm. The width $W_4$ is 18 mm (e.g., with a prism 146 in an optical path between the collimator 124 and the filter 102 proximate common ports 114 and 134).

With reference specifically to FIG. 4B, a height $H_4$ of the two-layer 152 and 154 of the WDM device 200 is 4 mm. The footprint of the redundant WDM device 200 is 864 mm$^2$, which is more compact than two of the devices 50 shown in FIGS. 2A and 2B, which total 962 mm$^2$. This amounts to a reduction in the footprint of about 10% relative to duplication of the device 50 shown in FIGS. 2A and 2B. The dimensions of length $L_4$, $W_4$, and $H_4$ are summarized in one of the lines in Table 1 at the end of this section of the disclosure, and do not include a strain relief for the optical fibers 126, 130, and 132 or a housing for the WDM device 200, which will add a few millimeters in all directions.

While exemplary dimensions are provided for a redundant 8-channel device, the dimensions $L_4$ and $H_4$ remain substantially the same for devices having more or fewer channels than 8 channels. However, the width dimension $W_4$ will increase or decrease with an increase or decrease, respectively, in the number of channel ports of the device 200. Exemplary 12 channel and 24 channel device dimensions 2-layer alternative stacked arrangement (similar to the WDM device 200) are listed in Table 2 at the end of this section of the disclosure. Thus, embodiments of the disclosure are not limited by the number of channel ports.

Figure 5A:
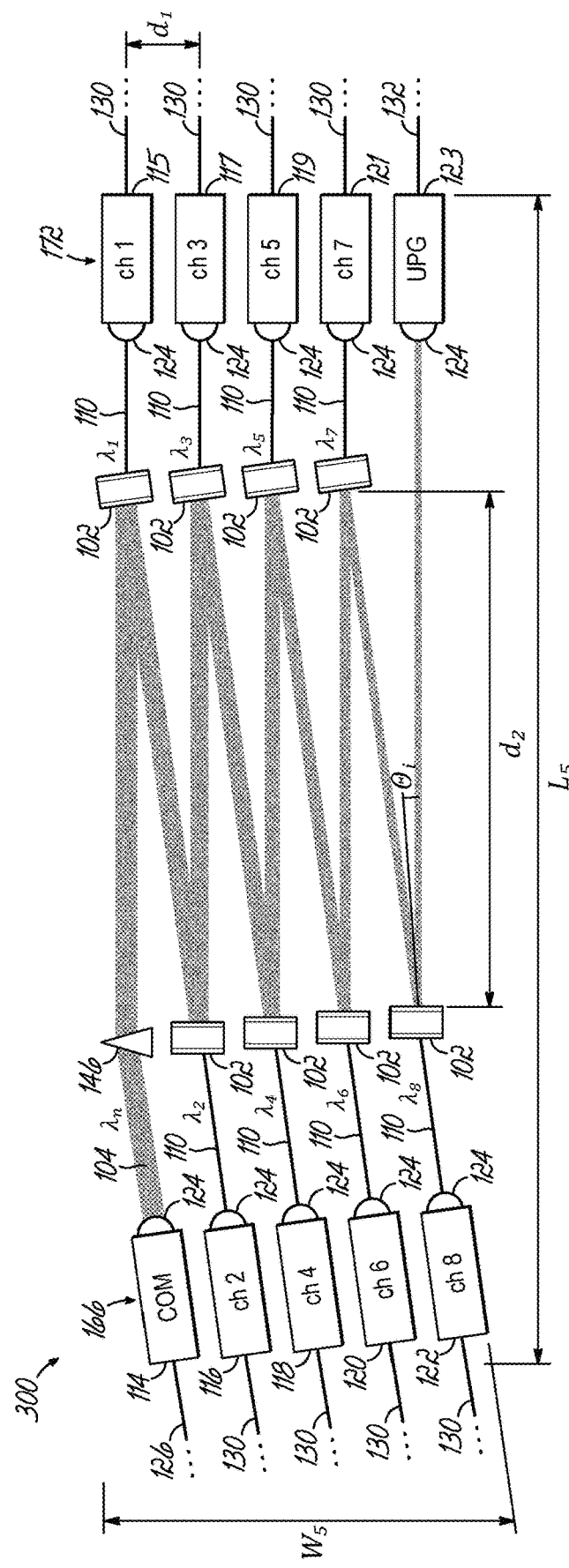
FIGS. 5A and 5B are schematic plan and elevation views, respectively, of an exemplary redundant WDM device in accordance with one embodiment of the disclosure.
Figure 5B:
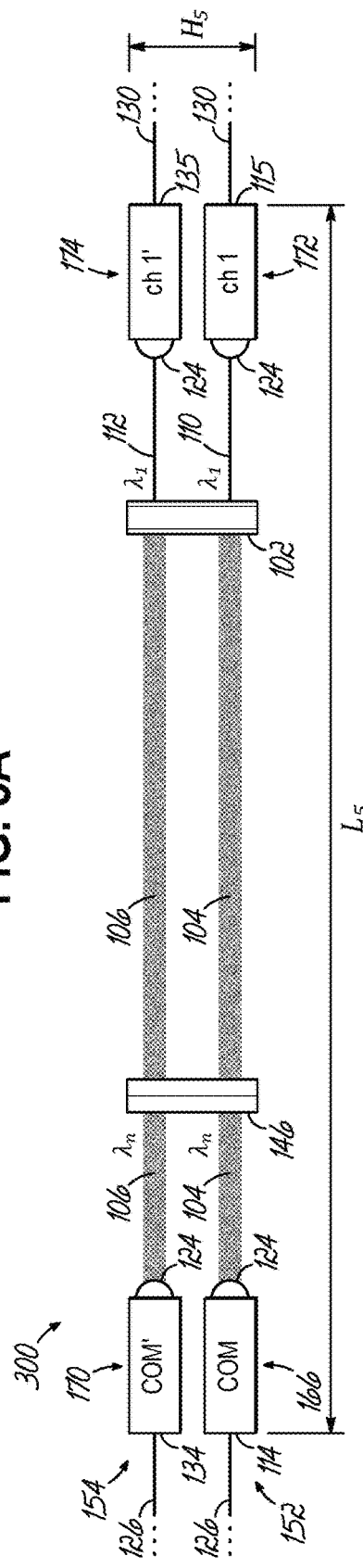

With reference to FIGS. 5A and 5B in which like reference numerals refer to like elements of FIGS. 3A-4B, in one embodiment of the disclosure, a redundant WDM device 300 uses the plurality of bandpass filters 102 to define the first optical path for the first optical beam 104 and the second optical path for the second optical beam 106 in the same manner as the optical paths shown in FIGS. 3A-4B. In other words, the filters 102 define two separate, though parallel, optical paths. The redundant WDM device 300 is configured to process each of the optical beams 104 and 106 simultaneously. The optical beams 104 and 106 co-propagate in the WDM device 300.

In that regard, the first optical beam 104 includes a plurality of different optical signals 110. In the WDM device 300 of FIG. 5A, there are at least 8 different optical signals 110 represented by $\lambda_1$ through $\lambda_8$ in the first optical beam 104. There are also at least 8 different optical signals 112 in the second optical beam 106 also represented by $\lambda_1$ through $\lambda_8$. Although the optical beams 104 and 106 are different, spaced apart beams, the optical signals 110 and 112 from a respective one of the filters 102 are the same wavelength $\lambda_n$. From each filter 102, two optical signals 110 and 112 of the same wavelength $\lambda_n$ pass.

As shown, the redundant WDM device 300 is a two-layer design with the first layer 152 being situated adjacent the second layer 154. This is shown best in FIG. 5B. Similar to the WDM device 100 and 200, the WDM device 300 is bi-directional. Thus, the redundant WDM device 300 can be used as a multiplexer, demultiplexer, or both a multiplexer and demultiplexer.

In the exemplary 8-channel redundant WDM device 300, there are two columns of stacked channel ports spaced apart by filters 102. Specifically, with the two layers 152 and 154, one set of ports 114-123 (i.e., COM, ch 2, ch 4, ch 6, ch 8 on the left side of FIG. 5A and ch 1, ch 3, ch 5, ch 7, and UPG on the right side of FIG. 5A) resides in the first layer 152. One set of redundant ports 134-143 (i.e., COM', ch 2', ch 4', ch 6', ch 8' on the left side of FIG. 5A (not shown), and ch 1', ch 3', ch 5', ch 7', and UPG' on the right side of FIG. 5A (not shown)) resides in the second layer 154. The ports 114-143 are stacked in columns in each layer and are spaced apart by filters 102.

Specifically, the ports 114, 116, 118, 120, 122 for the first optical beam 104 are stacked in a single column 166, without interleaving of any other ports, in the first layer 152. The ports 115, 117, 119, 121, and 123 are stacked in a single column 172, without interleaving of any other ports, in the first layer 152. Although not shown, an optional tap port (TAP) for monitoring one or more of the optical signals 110, 112 may also be included.

Similarly, in the second layer 154, there are two columns of stacked channel ports spaced apart by filters 102. In that regard, ports 134, 136, 138, 140, 142 for the second optical beam 106 are stacked in a column 170, without interleaving of any other ports, in the second layer 154. And, ports 135, 137, 139, 141, and 143 for optical signals 112 in the second optical beam 106 are stacked in a column 174, without interleaving of any other ports, in the second layer 154. The columns 166 and 170 are side-by-side, and the columns 172 and 174 are side-by-side. The filters 102 are oriented with a longitudinal axis spanning the first layer 152 and the second layer 154 between column pairs 166, 170 and 172, 174. From a different perspective, the longitudinal axis of the filters 102 is perpendicular to planes defined by each of the layers 152 and 154. As shown, the number of channel ports is 16 and number of filters is 8.

The compactness of the WDM device 300 depends on internal spacing as well as the physical size of the filters 102 and ports 114-123 and 134-143. Internal spacing of the WDM device 300 is determined by a lateral distance $d_1$ between centerlines of adjacent ports receiving optical signals from the same optical beam. For example, with reference to FIG. 5A, the lateral distance $d_1$ is measured between centerlines of port 115 and port 117 (i.e., ch 1 and ch 3). This lateral distance $d_1$ includes physical space between the ports 115 and 117. Alternatively, the lateral distance $d_1$ may depend on the dimension of the filter 102 plus spacing between adjacent filters 102. The filters 102 may be larger in at least one dimension than the filters 12 shown in FIGS. 1A, 1B, 2A, and 2B so that there is sufficient surface area for both the optical beams 104 and 106 to simultaneously impinge upon the filter 102 at an angle of incidence $\theta_i$. By way of example, the filters 102 may be twice as large in one dimension than filters 12 and so may be 2.5 mm to 3.5 mm in one dimension. The values of $\theta_i$ and $d_1$ define the transverse distance $d_2$ between adjacent filters 102 in the optical beams 104, 106 according to the principles of trigonometry.

The internal values $d_1$, $d_2$, and $\theta_i$ and physical dimensions of the ports 114-123 and ports 134-143 with respect to the WDM device 300 of FIGS. 5A and 5B effect the outer dimensions of the device 300. In FIGS. 5A and 5B, the WDM device 300 has an angle of incidence $\theta_i$ of 4°. An exemplary lateral distance $d_1$ is 2.5 mm to allow sufficient spacing between adjacent ports 114-123 and 134-143 or to allow sufficient spacing between adjacent filters 102. An exemplary transverse distance $d_2$ is 17.2 mm. With each of $d_1$, $d_2$, and $\theta_i$ for the redundant 8-channel WDM device 300 shown in FIG. 5A, a length $L_5$ is 44 mm. A width $W_5$ is 13 mm. With reference specifically to FIG. 5B, a height $H_5$ of the WDM device 300 is 3.5 mm. The dimensions of length $L_5$, $W_5$, and $H_5$ are summarized in one of the lines in Table 1 at the end of this section of the disclosure, and do not include a strain relief for the optical fibers 126, 130, and 132 or a housing for the WDM device 300, which will add a few millimeters in all directions.

While exemplary dimensions are provided for a redundant 8-channel device, the dimensions $L_5$ and $H_5$ remain substantially the same for devices having more or fewer channels than 8 channels. However, the width dimension $W_5$ will increase or decrease with an increase or decrease, respectively, in the number of channel ports of the device 300. Exemplary 12 channel and 24 channel device dimensions for a 2-layer side-by-side arrangement (similar to the WDM device 300) are listed in Table 2 at the end of this section of the disclosure. Thus, embodiments of the disclosure are not limited by the number of channel ports.

With reference to FIGS. 6A and 6B in which like reference numerals refer to like elements of FIGS. 3A-5B, in one embodiment of the disclosure, a redundant WDM device 400 uses the plurality of bandpass filters 102 to define the first optical path for the first optical beam 104 and the second optical path for the second optical beam 106 in the same manner as the optical paths shown in FIGS. 3A-5B. In other words, the filters 102 define two separate, though parallel, optical paths. The redundant WDM device 400 is configured to process each of the optical beams 104 and 106 simultaneously. Unlike the redundant WDM device 300 of FIGS. 5A and 5B, the optical beams 104 and 106 counter propagate in the WDM device 400.

In that regard, the first optical beam 104 includes a plurality of different optical signals 110. In the WDM device 400 of FIG. 6A, there are at least 8 different optical signals 110 represented by $\lambda_1$ through $\lambda_8$ in the first optical beam 104. There are also at least 8 different optical signals 112 in the second optical beam 106 also represented by $\lambda_1$ through $\lambda_8$. Although the optical beams 104 and 106 are different, spaced apart beams, the optical signals 110 and 112 from a respective one of the filters 102 are the same wavelength $\lambda_n$. From each filter 102, two optical signals 110 and 112 of the same wavelength $\lambda_n$ are transmitted.

As shown, the redundant WDM device 400 is a two-layer design with the first layer 152 being situated adjacent the second layer 154. This is shown best in FIG. 6B. Similar to the WDM device 100, 200, and 300, the WDM device 400 is bi-directional. Thus, the redundant WDM device 400 can be used as a multiplexer, demultiplexer, or both a multiplexer and demultiplexer.

In the exemplary 8-channel redundant WDM device 400, with the two layers 152 and 154, one set of ports 114-123 (i.e., COM, ch 2, ch 4, ch 6, ch 8 on the left side of FIG. 6A, and ch 1, ch 3, ch 5, ch 7, and UPG on the right side of FIG. 6A) resides in the first layer 152. One set of redundant ports 134-143 (i.e., ch 1', ch 3', ch 5', ch 7', and COM' on the right side of FIG. 6A and UPG', ch 2', ch 4', ch 6', ch 8' on the left side of FIG. 6A) resides in the second layer 154. This arrangement differs from the redundant WDM device 300 of FIG. 5A in that the COM' port 134 and UPG' port 143 are swapped. For example, in demultiplexing operation, the second optical beam 106 is introduced at the bottom right corner of the device shown in FIG. 6A. This provides the counter-propagating feature of the WDM device 400. Although not shown, an optional tap port (TAP) for monitoring one or more of the optical signals 110, 112 may also be included.

The ports 114-143 are stacked in single columns in each layer. Specifically, the channel ports 114, 116, 118, 120, 122 for the first optical beam 104 are stacked in a single column 166, without interleaving of any other ports, in the first layer 152. The channel ports 115, 117, 119, 121, and 123, also for the first optical beam 104, are stacked in a single column 172, without interleaving of any other ports, in the first layer 152.

Similarly, in the second layer 154, there are two columns of stacked channel ports. In that regard, redundant ports 136, 138, 140, 142, 143 for the second optical beam 106 are stacked in the single column 170, without interleaving of any other ports, in the second layer 154. And, ports 134, 135, 137, 139, and 141 for optical signals 112 in the second optical beam 106 are stacked in a single column 174, without interleaving of any other ports, in the second layer 154. The columns 166 and 170 are side-by-side, and the columns 172 and 174 are side-by-side. The column 166 is angled relative to the column 170. The angulation is facilitated by a prism 146 proximate COM port 114. The angulation of the column 166 may be equal to the angle of incidence $\theta_i$. The angulation may improve the stability of the stacks of ports. A similar angulation is achieved in the second layer 154 by a prism 146. The longitudinal axis of the filters 102 is perpendicular to planes defined by each of the layers 152 and 154. The filters 102 are therefore oriented with a longitudinal axis spanning the first layer 152 and the second layer 154 to simultaneously interact with the first and second optical beams 104 and 106. The optical beams 104 and 106 propagate in parallel but opposing directions. As shown, the number of channel ports is 16 and number of filters is 8.

The compactness of the WDM device 400 depends on internal spacing as well as the physical size of the filters 102 and ports 114-123 and 134-143. Internal spacing of the WDM device 400 is determined by a lateral distance $d_1$ between centerlines of adjacent ports receiving optical signals from the same optical beam. For example, with reference to FIG. 6A, the lateral distance $d_1$ is measured between centerlines of port 115 and port 117 (i.e., ch 1 and ch 3). This lateral distance $d_1$ includes physical space between the ports 115 and 117. Alternatively, the lateral distance $d_1$ may depend on the dimension of the filter 102 plus spacing between adjacent filters 102. The filters 102 may be larger in at least one dimension than the filters 12 shown in FIGS. 1A, 1B, 2A, and 2B so that there is sufficient surface area for both the optical beams 104 and 106 to simultaneously impinge upon the filter 102 at an angle of incidence $\theta_i$. By way of example, the filters 102 may be twice as large in one dimension than filters 12 and so may be 2.5 mm to 3.5 mm in one dimension. The values of $\theta_i$ and $d_1$ define the transverse distance $d_2$ between adjacent filters 102 in the optical beams 104, 106 according to the principles of trigonometry.

The internal values $d_1$, $d_2$, and $\theta_i$ and the physical dimensions of the ports 114-123 and ports 134-143 with respect to the WDM device 400 of FIGS. 6A and 6B effect the outer dimensions of the device 400. In FIGS. 6A and 6B, the WDM device 400 has an angle of incidence $\theta_i$ of 4°. An exemplary lateral distance $d_1$ is 2.5 mm to allow sufficient spacing between adjacent ports 114-123 and 134-143 or to allow sufficient spacing between adjacent filters 102. An exemplary transverse distance $d_2$ is 17.2 mm. This may also represent one dimension of the filter 102 as shown in FIG. 6A. With each of $d_1$, $d_2$, and $\theta_i$, for the redundant 8-channel WDM device 400 shown in FIG. 6A, a length $L_6$ is 44 mm. A width $W_6$ is 13 mm. With reference specifically to FIG. 6B, a height $H_6$ of the WDM device 400 is 3.5 mm. The dimensions of length $L_6$, $W_6$, and $H_6$ are summarized in one of the lines in Table 1 at the end of this section of the disclosure, and do not include a strain relief for the optical fibers 126, 130, and 132 or a housing for the WDM device 300, which will add a few millimeters in all directions.

While exemplary dimensions are provided for a redundant 8-channel device, the dimensions $L_6$ and $H_6$ remain substantially the same for devices having more or fewer channels than 8 channels. However, the width dimension $W_6$ will increase or decrease with an increase or decrease, respectively, in the number of channel ports of the device 400. Exemplary 12 channel and 24 channel device dimensions for a 2-layer side-by-side counterpropagating arrangement (similar to the WDM device 400) are listed in Table 2 at the end of this section of the disclosure. Thus, embodiments of the disclosure are not limited by the number of channel ports.

Figure 7A:
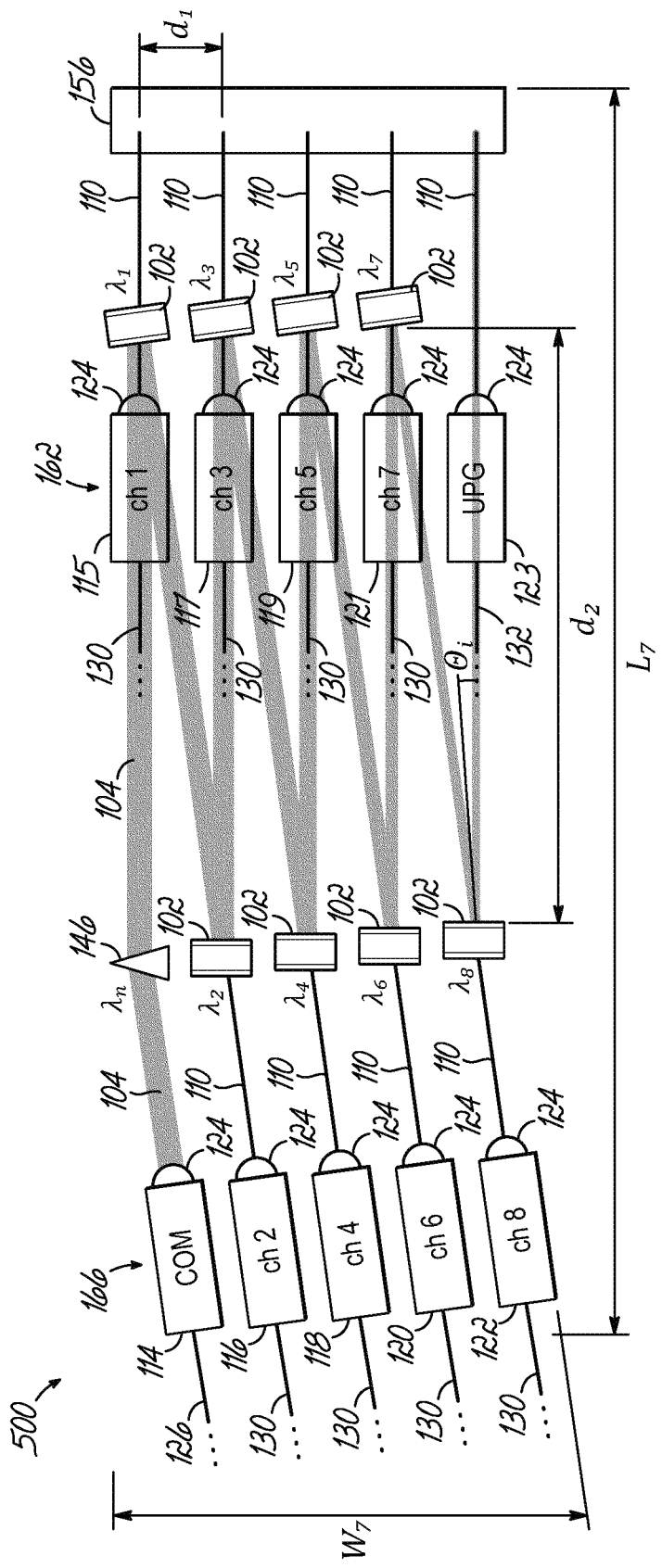
FIGS. 7A and 7B are schematic plan and elevation views, respectively, of an exemplary redundant WDM device in accordance with one embodiment of the disclosure.
Figure 7B:
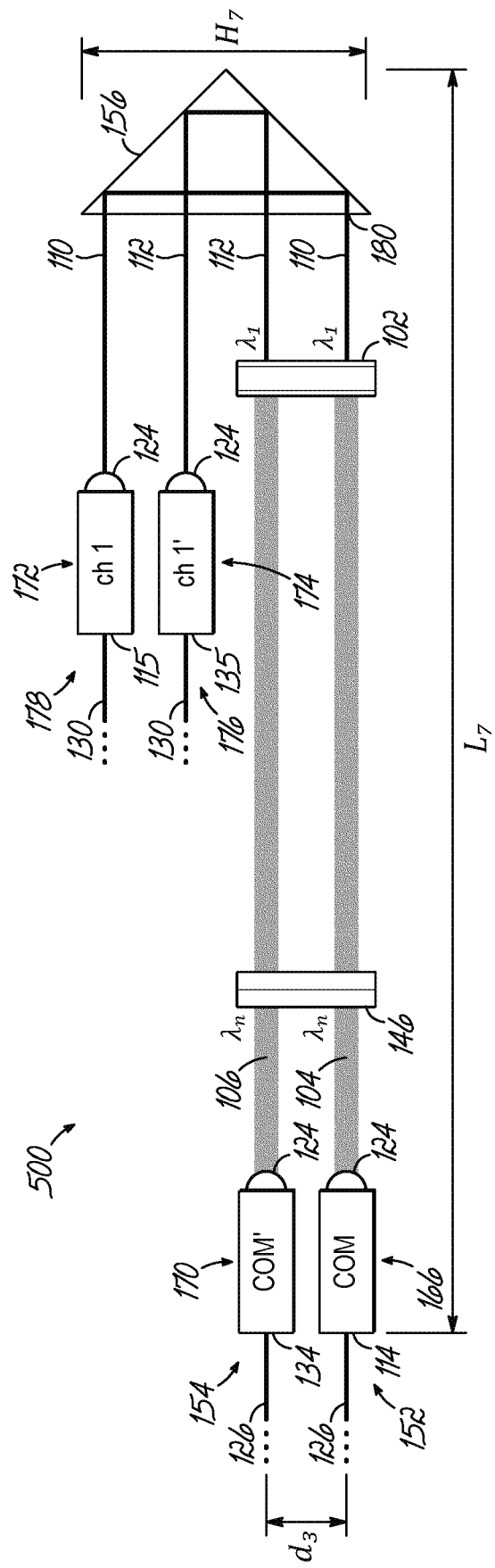

With reference to FIGS. 7A and 7B in which like reference numerals refer to like elements of FIGS. 3A-6B, in one embodiment of the disclosure, a redundant WDM device 500 uses the plurality of bandpass filters 102 to define the first optical path for the first optical beam 104 and the second optical path for the second optical beam 106 in the same manner as the optical paths shown in FIGS. 3A-6B. In other words, the filters 102 define two separate, though parallel, optical paths. The redundant WDM device 500 is configured to process each of the optical beams 104 and 106 simultaneously. The optical beams 104 and 106 co-propagate in the WDM device 500.

In that regard, the first optical beam 104 includes a plurality of different optical signals 110. In the WDM device 500 of FIG. 7A, there are at least 8 different optical signals 110 represented by $\lambda_1$ through $\lambda_8$ in the first optical beam 104. There are also at least 8 different optical signals 112 in the second optical beam 106 also represented by $\lambda_1$ through $\lambda_8$. Although the optical beams 104 and 106 are different, spaced apart beams, the optical signals 110 and 112 from a respective one of the filters 102 are the same wavelength $\lambda_n$. From each filter 102, two optical signals 110 and 112 of the same wavelength $\lambda_n$ are transmitted.

As shown, the redundant WDM device 500 is a double stacked two-layer design. Essentially, the WDM device 500 has four layers formed from refracting two side-by-side layers. In that regard, the first layer 152 is situated adjacent the second layer 154. A third layer 176 and a fourth layer 178 are formed by refracting the optical signals 110 and 112 from the second layer 154 and the first layer 152, respectively. This is shown best in FIG. 7B. Similar to the WDM device 100, 200, 300, and 400, the WDM device 500 is bi-directional. Thus, the redundant WDM device 500 can be used as a multiplexer, demultiplexer, or both a multiplexer and demultiplexer.

In the exemplary 8-channel redundant WDM device 500, with the four layers 152, 154, 176, and 178, a set of ports 114, 116, 118, 120, 122 (i.e., COM, ch 2, ch 4, ch 6, ch 8) resides in the first layer 152 and are stacked in the column 166, without interleaving of any other ports. The matching, redundant set of ports 134, 136, 138, 140, 142 (i.e., COM', ch 2', ch 4', ch 6', ch 8') resides in the second layer 154 and are stacked in column 170, without interleaving of any other ports. In the third layer 176, a set of ports 135, 137, 139, 141, 143 (i.e., ch 1', ch 3', ch 5', ch 7', and UPG') is stacked in the column 174, without interleaving of any other ports. And, in the fourth layer 178, a set of ports 115, 117, 119, 121, 123 (i.e., ch 1, ch 3, ch 5, ch 7, and UPG) is stacked in the column 172, without interleaving of any other ports. The columns 166 and 170 are side-by-side, and the columns 172 and 174 are side-by-side. Although not shown, an optional tap port (TAP) for monitoring one or more of the optical signals 110, 112 may also be included.

With reference to FIG. 7B, during demultiplexing, the optical beam 104 from the COM port 114 impinges on the filter at 180. The optical beam 106 from the COM port 134 impinges on the filter also at 180. The optical signal 110 of $\lambda_1$ passes filter at 180 and is refracted 180° by the prism 156 to the fourth layer 178. Similarly, the optical signal 112 of $\lambda_1$ passes filter at 180 and is refracted 180° by the prism 156 to the third layer 176. This provides the co-propagating feature of the WDM device 500. While the prism 156 is shown between the filters 102 and the ports 115, 117, 119, 121, 123, 135, 137, 139, 141, and 143, the prism 156 may be in an optical path between filters 102 in the optical beams 104 and 106, or in an optical path between the ports 114, 116, 118, 120, 122, 134, 136, 138, 140, 142 and the filters 102. While the prism 156 is shown and described, other devices, such as a mirror, may be utilized to fold the beams/signals. Embodiments of the disclosure are not limited to use of prisms.

As shown in FIG. 7B, the longitudinal axis of the filters 102 is perpendicular to planes defined by each of the layers 152 and 154. The filters 102 are therefore oriented with a longitudinal axis spanning the first layer 152 and the second layer 154 to simultaneously interact with the first and second optical beams 104 and 106, which propagate in parallel directions. As shown, the number of channel ports is 16 and number of filters is 8.

The compactness of the WDM device 500 depends on internal spacing as well as the physical size of the filters 102 and ports 114-123 and 134-143. Internal spacing of the WDM device 500 is determined by a lateral distance $d_1$ between centerlines of adjacent ports receiving optical signals from the same optical beam. For example, with reference to FIG. 7A, the lateral distance $d_1$ is measured between centerlines of port 115 and port 117 (i.e., ch 1 and ch 3). This lateral distance $d_1$ includes physical space between the immediately adjacent ports 115 and 117. Alternatively, the lateral distance $d_1$ may depend on the dimension of the filter 102 plus spacing between adjacent filters 102. The filters 102 may be larger in at least one dimension than the filters 12 shown in FIGS. 1A, 1B, 2A, and 2B so that there is sufficient surface area for both the optical beams 104 and 106 to simultaneously impinge upon the filter 102 at an angle of incidence $\theta_i$. By way of example, the filters 102 may be twice as large in one dimension than filters 12 and so may be 2.5 mm to 3.5 mm long in one dimension perpendicular to the planes of layers 152 and 154. The values of $\theta_i$ and $d_1$ define the transverse distance $d_2$ between adjacent filters 102 in the optical beams 104, 106 according to the principles of trigonometry.

The internal values $d_1$, $d_2$, $d_3$, and $\theta_i$ and physical dimensions of the ports 114-123 and ports 134-143 with respect to the WDM device 500 of FIGS. 7A and 7B effect the outer dimensions of the device 500. In FIGS. 7A and 7B, the WDM device 500 has an angle of incidence $\theta_i$ of 4°. An exemplary lateral distance $d_1$ is 2.5 mm to allow sufficient spacing between adjacent ports 114-123 and 134-143 in their respective columns 166, 170, 172, 174 or to allow sufficient spacing between adjacent filters 102. An exemplary transverse distance $d_2$ is 17.2 mm. As shown, a centerline-to-centerline spacing $d_3$ of the columns 166 and 170 is 2.0 mm. With each of $d_1$, $d_2$, $d_3$, and $\theta_i$ for the redundant 8-channel WDM device 500 shown in FIG. 7A, a length $L_7$ is 37 mm. A width $W_7$ is 13 mm. With reference specifically to FIG. 7B, a height $H_7$ of the WDM device 500 is 8 mm, which may be determined by the prism 156. The dimensions of length $L_7$, $W_7$, and $H_7$ are summarized in one of the lines in Table 1 at the end of this section of the disclosure, and do not include a strain relief for the optical fibers 126, 130, and 132 or a housing for the WDM device 500, which will add a few millimeters in all directions.

While exemplary dimensions are provided for a redundant 8-channel device, the dimensions $L_7$ and $H_7$ remain the same for devices having more or fewer channels than 8 channels. However, the width dimension $W_7$ will increase or decrease with an increase or decrease, respectively, in the number of channel ports of the device 500. Exemplary 12 channel and 24 channel device dimensions for a 4-layer side-by-side arrangement (similar to the WDM device 500) are listed in Table 2 at the end of this section of the disclosure. Thus, embodiments of the disclosure are not limited by the number of channel ports.

Figure 8A:
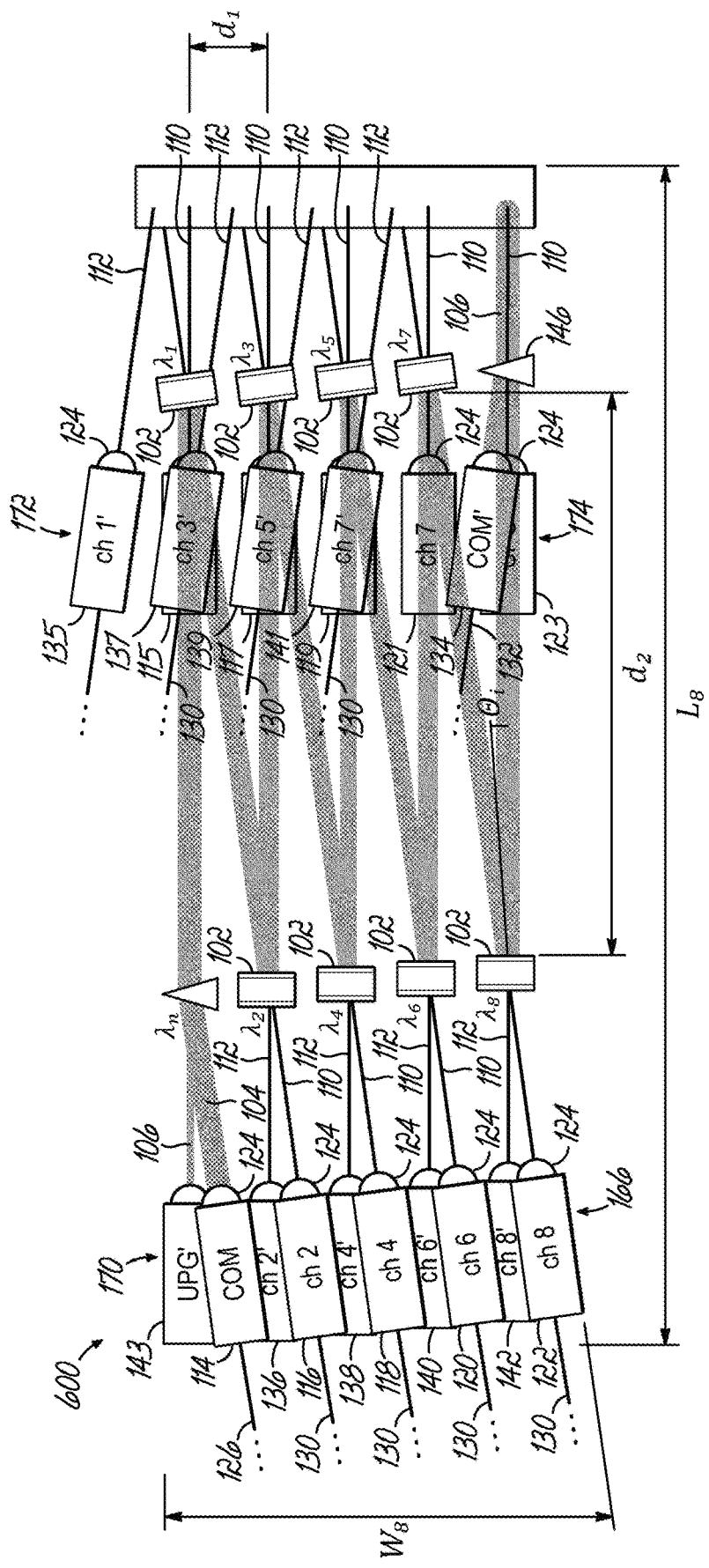
FIGS. 8A and 8B are schematic plan and elevation views, respectively, of an exemplary WDM device in accordance with one embodiment of the disclosure.
Figure 8B:
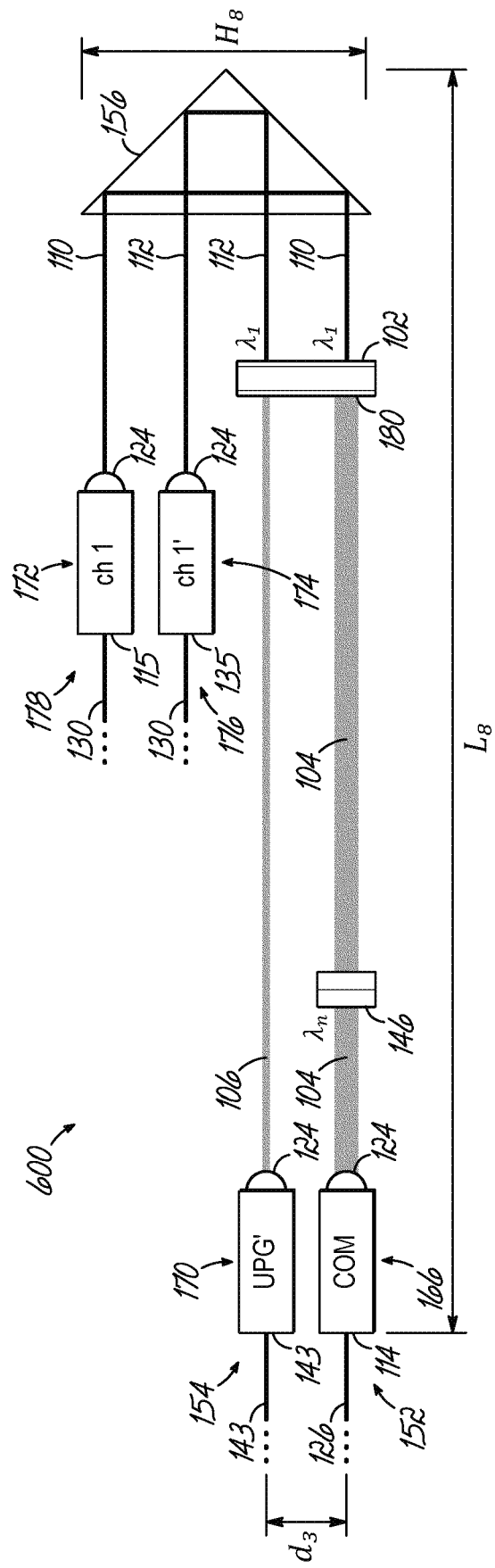

With reference to FIGS. 8A and 8B in which like reference numerals refer to like elements of FIGS. 3A-7B, in one embodiment of the disclosure, a redundant WDM device 600 uses the plurality of bandpass filters 102 to define the first optical path for the first optical beam 104 and the second optical path for the second optical beam 106 in the same manner as the optical paths shown in FIGS. 3A-6B. In other words, the filters 102 define two separate, though parallel, optical paths. The redundant WDM device 600 is configured to process each of the optical beams 104 and 106 simultaneously. Unlike the redundant WDM device 500 of FIGS. 7A and 7B, the optical beams 104 and 106 counter propagate in the WDM device 600.

In that regard, the first optical beam 104 includes a plurality of different optical signals 110. In the WDM device 600 of FIG. 8A, there are at least 8 different optical signals 110 represented by $\lambda_1$ through $\lambda_8$ in the first optical beam 104. There are also at least 8 different optical signals 112 in the second optical beam 106 also represented by $\lambda_1$ through $\lambda_8$. Although the optical beams 104 and 106 are different, spaced apart beams, the optical signals 110 and 112 from a respective one of the filters 102 are the same wavelength $\lambda_n$. From each filter 102, two optical signals 110 and 112 of the same wavelength $\lambda_n$ are transmitted.

As shown, the redundant WDM device 600 is a double stacked two-layer design. Essentially, the WDM device 600 has four layers formed from refracting two side-by-side layers 152, 154 to produce the third layer 176 and the fourth layer 178. This is shown best in FIG. 8B. Similar to the WDM device 100, 200, 300, 400, and 500, the WDM device 600 is bi-directional. The arrangement differs from the redundant WDM device 500 of FIG. 7A in that the COM' port 134 and UPG' port 143 are swapped corner for corner. For a demultiplexing operation, the second optical beam 106 is introduced at the bottom right corner of the device shown in FIG. 8A. This provides the counter-propagating feature of the WDM device 600. Thus, the redundant WDM device 600 can be used as a multiplexer, demultiplexer, or both a multiplexer and demultiplexer.

In the exemplary 8-channel redundant WDM device 600, with the four layers 152, 154, 176, and 178, a set of ports 114, 116, 118, 120, 122 (i.e., COM, ch 2, ch 4, ch 6, ch 8) resides in the first layer 152 and are stacked in the column 166, without interleaving of any other ports. In the second layer 154, a set of ports 136, 138, 140, 142, 143 (i.e., ch 2', ch 4', ch 6', ch 8', UPG') are stacked in column 170, without interleaving of any other ports. In the third layer 176, a set of ports 134, 135, 137, 139, 141, (i.e., COM', ch 1', ch 3', ch 5', and ch 7') is stacked in the column 174, without interleaving of any other ports. And, in the fourth layer 178, a set of channel ports 115, 117, 119, 121, 123 (i.e., ch 1, ch 3, ch 5, ch 7, and UPG) is stacked in the column 172, without interleaving of any other ports. The columns 166 and 170 are side-by-side and the columns 172 and 174 are side-by-side. Although not shown, an optional tap port (TAP) for monitoring one or more of the optical signals 110, 112 may also be included.

With reference to FIG. 8B, during demultiplexing, for example, the optical beam 104 from the COM port 114 impinges on the filter 102. The optical signal 110 of $\lambda_1$ passes the filter 102 at 180 in accordance with the bandpass of the filter 102 and is refracted 180° by the prism 156 to the fourth layer 178 to be received by the collimator 124 of the channel port 115. The optical signal 112 of $\lambda$ passes the filter 102 at 180 and is refracted 180° by the prism 156 to the third layer 176 to be received by collimator 124 of the channel port 135. While the prism 156 is shown between the filters 102 and the ports 115, 117, 119, 121, 123, 134, 135, 137, 139, and 141, the prism 156 may be in an optical path between filters 102 in the optical beams 104 and 106, or in an optical path between the ports 114, 116, 118, 120, 122, 136, 138, 140, 142, and 143 and the filters 102. While the prism 156 is shown and described, other devices, such as a mirror, may be utilized to fold the beams/signals. Embodiments of the disclosure are not limited to use of prisms.

As shown in FIG. 8B, the longitudinal axis of the filters 102 is perpendicular to planes defined by each of the layers 152 and 154. The filters 102 are therefore oriented with a longitudinal axis spanning the first layer 152 and the second layer 154 to simultaneously interact with the first and second optical beams 104 and 106, which propagate in parallel directions. As shown, the number of channel ports is 16 and number of filters is 8.

The compactness of the WDM device 600 depends on internal spacing as well as the physical size of the filters 102 and ports 114-123 and 134-143. Internal spacing of the WDM device 600 is determined by a lateral distance $d_1$ between centerlines of adjacent ports receiving optical signals from the same optical beam. For example, with reference to FIG. 8A, the lateral distance $d_1$ is measured between centerlines of port 115 and port 117 (i.e., ch 1 and ch 3). This lateral distance $d_1$ includes physical space between the immediately adjacent ports 115 and 117. Alternatively, the lateral distance $d_1$ may depend on the dimension of the filter 102 plus spacing between adjacent filters 102. The filters 102 may be larger in at least one dimension than a corresponding dimension of the filters 12 shown in FIGS. 1A, 1B, 2A, and 2B so that there is sufficient surface area for both the optical beams 104 and 106 to simultaneously impinge upon the filter 102 at an angle of incidence $\theta_i$. By way of example, the filters 102 may be twice as large in one dimension than filters 12 and so may be 2.5 mm to 3.5 mm long in one dimension. That dimension may be oriented perpendicular to the planes of layers 152 and 154. The values of $\theta_i$ and $d_1$ define the transverse distance $d_2$ between adjacent filters 102 in the optical beams 104, 106 according to the principles of trigonometry.

The internal values $d_1$, $d_2$, $d_3$, and $\theta_i$ with respect to the WDM device 600 of FIGS. 8A and 8B effect the outer dimensions of the device 600. For example, a width $W_8$ of the device 600 is dependent on the lateral distance $d_1$ and the number of ports 114-123 and 134-143. A length $L_8$ of the WDM device 600 is dependent on the transverse distance $d_2$, which is itself dependent on the angle of incidence $\theta_i$ and transverse distance $d_1$. Outer dimensions are also dependent on physical dimensions of the ports 114-123 and ports 134-143.

In FIGS. 8A and 8B, the WDM device 600 has an angle of incidence $\theta_i$ of 4°. An exemplary lateral distance $d_1$ is 2.5 mm to allow sufficient spacing between adjacent ports 114-123 and 134-143 in their respective columns 166, 170, 172, 174 or to allow sufficient spacing between adjacent filters 102. An exemplary transverse distance $d_2$ is 17.2 mm. As shown, a centerline-to-centerline spacing $d_3$ of the columns 166 and 170 is 2.0 mm. With each of $d_1$, $d_2$, $d_3$, and $\theta_i$, for the redundant 8-channel WDM device 600 shown in FIG. 8A, the device length $L_8$ is 37 mm. The width $W_8$ is 15 mm. With reference specifically to FIG. 8B, a height $H_8$ of the WDM device 600 is 8 mm, which may be determined by the prism 156. The dimensions of length $L_8$, $W_8$, and $H_8$ are summarized in one of the lines in Table 1 at the end of this section of the disclosure, and do not include a strain relief for the optical fibers 126, 130, and 132 or a housing for the WDM device 600, which will add a few millimeters in all directions.

While exemplary dimensions are provided for a redundant 8-channel device, the dimensions $L_8$ and $H_8$ remain the same for devices having more or fewer channels than 8 channels. However, the width dimension $W_8$ will increase or decrease with an increase or decrease, respectively, in the number of channel ports of the device 600. Exemplary 12 channel and 24 channel device dimensions for a 4-layer side-by-side counterpropagating arrangement (similar to the WDM device 600) are listed in Table 2 at the end of this section of the disclosure. Thus, embodiments of the disclosure are not limited by the number of channel ports.

Figure 9A:
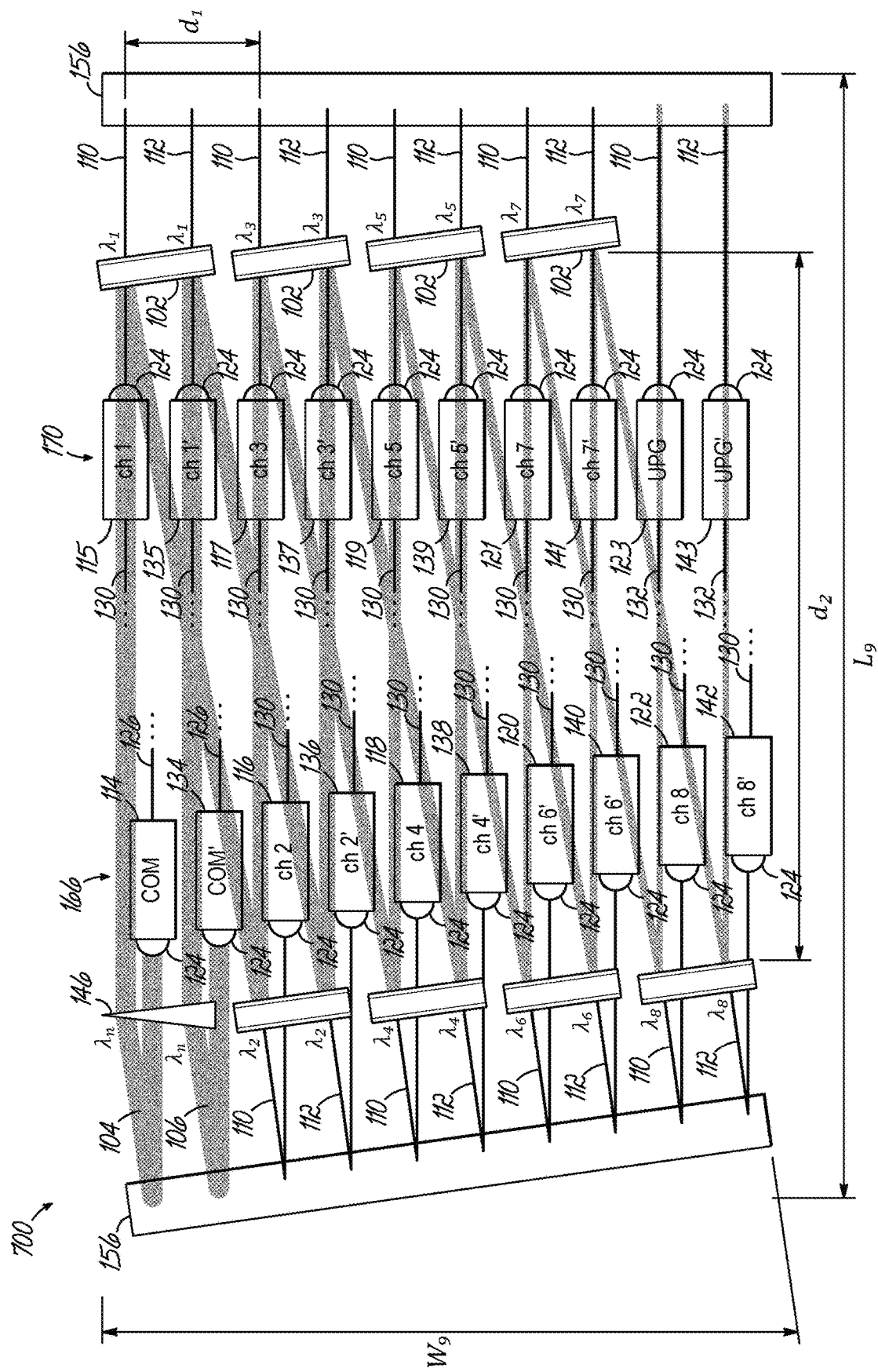
FIGS. 9A and 9B are schematic plan and elevation views, respectively, of an exemplary redundant WDM device in accordance with one embodiment of the disclosure.
Figure 9B:
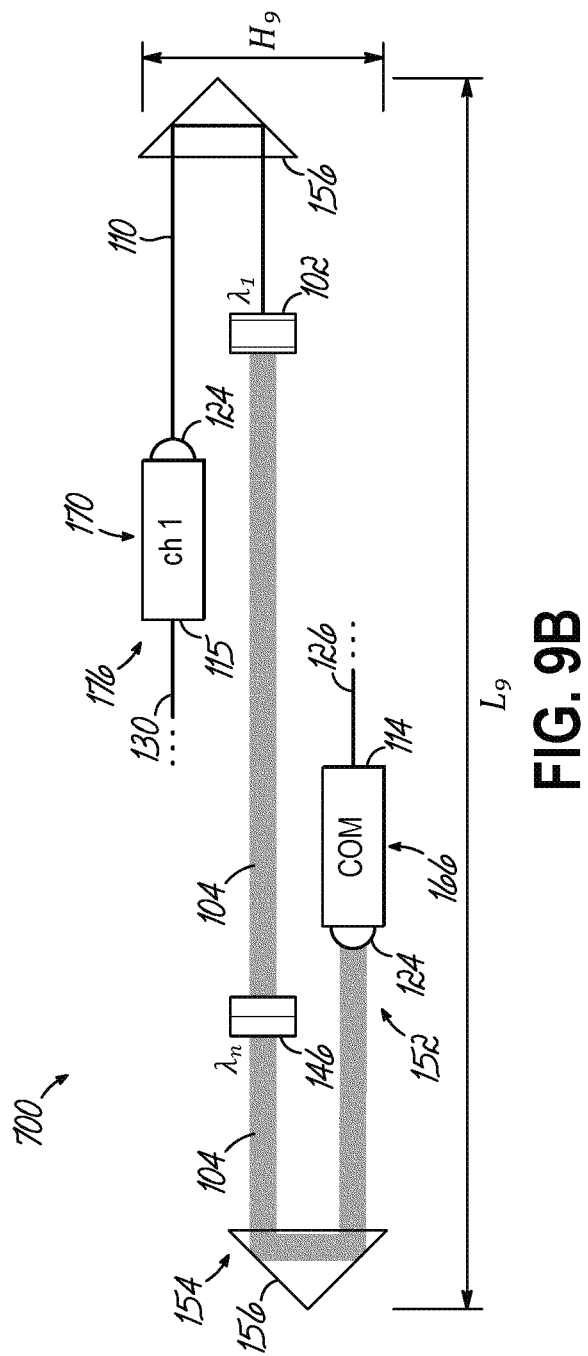

With reference to FIGS. 9A and 9B in which like reference numerals refer to like elements of FIGS. 3A-8B, in one embodiment of the disclosure, a redundant WDM device 700 uses the plurality of bandpass filters 102 to define the first optical path for the first optical beam 104 and the second optical path for the second optical beam 106 in the same manner as the optical paths shown in FIGS. 3A-8B. In other words, the filters 102 define two separate, though parallel, optical paths. The redundant WDM device 700 is configured to process each of the optical beams 104 and 106 simultaneously. The optical beams 104 and 106 co-propagate in the WDM device 700.

In that regard, the first optical beam 104 includes a plurality of different optical signals 110. In the WDM device 700 of FIG. 9A, there are at least 8 different optical signals 110 represented by $\lambda_1$ through $\lambda_8$ in the first optical beam 104. There are also at least 8 different optical signals 112 in the second optical beam 106 also represented by $\lambda_1$ through $\lambda_8$. Although the optical beams 104 and 106 are different, spaced apart beams, the optical signals 110 and 112 from a respective one of the filters 102 are the same wavelength $\lambda_n$. From each filter 102, two optical signals 110 and 112 of the same wavelength $\lambda_n$ are transmitted.

As shown, the redundant WDM device 700 is a three-layer design. As is shown best in FIG. 9B, columns of interleaved, stacked channel ports reside in two separate layers with a layer of the filters 102 therebetween. A prism 156 spans between the first layer 152 and the second layer 154 and a prism 156 spans between the second layer 154 and the third layer 176. Like the WDM device 100, 200, 300, 400, 500, and 600, the WDM device 700 is bi-directional. The arrangement differs from the redundant WDM device 200 of FIG. 4A in that a second prism 156 is positioned to refract the optical beams 104 and 106 and optical signals 110 and 112 between the filters 102 and the ports 114, 116, 118, 120, 122, 136, 138, 140, 142 (i.e., COM, ch 2, ch 4, ch 6, ch 8, COM', ch 2', ch 4', ch 6' and ch 8'). The redundant WDM device 700 can be used as a multiplexer, demultiplexer, or both a multiplexer and demultiplexer. Although not shown, while the exemplary redundant WDM device 700 is shown with three layers 152, 154, 176 produced by refraction with two prisms 156, a two-layer device may also be produced with the two prisms 156. By way of example only, one layer may include filters and another layer may include all ports. The ports would be positioned back-to-back with collimators facing in opposite directions and toward a respective one of the prisms.

The exemplary 8-channel redundant WDM device 700 includes three layers 152, 154, and 176. In the first layer 152, a set of ports 114, 116, 118, 120, 122, 134, 136, 138, 140, 142 (i.e., COM, ch 2, ch 4, ch 6, ch 8, COM', ch 2', ch 4', ch 6', and ch 8') are stacked in an interleaving arrangement in the column 166. In the second layer 154, there are 8 filters 102 and a prism 146 proximate the COM ports 114 and 134. In the third layer 176, a set of ports 115, 117, 119, 121, 123, 135, 137, 139, 141, 143 (i.e., ch 1, ch 3, ch 5, ch 7, UPG, ch 1', ch 3', ch 5', ch 7', and UPG') are stacked in an interleaving arrangement in column 170. Although not shown, an optional tap port (TAP) for monitoring one or more of the optical signals 110, 112 may also be included.

With reference to FIG. 9B, during demultiplexing, the optical beam 104 from the COM port 114 is refracted 180° by prism 156 from layer 152 to layer 154. In layer 154, the optical beam 104 is refracted by prism 146 and impinges on the filter 102. The optical signal 110 of $\lambda_1$ passes filter 102 in accordance with the bandpass of the filter 102 and is refracted 180° by the prism 156 from the second layer 154 to the third layer 176 to be received by the collimator 124 of channel port 115. The remaining optical signals 110 in the optical beam 104 are process by consecutive impingement on filters 102 as is generally shown in FIG. 9A. The optical beam 106 is similarly processed through the three layers 152, 154, 176 simultaneously. While the prism 156 is shown and described, other devices, such as a mirror, may be utilized to fold the beams/signals. Embodiments of the disclosure are not limited to use of prisms.

As shown in FIGS. 9A and 9B, the longitudinal axis of the filters 102 is parallel to the plane defined by the second layer 154. The filters 102 are therefore oriented with a longitudinal axis in the second layer 154 to simultaneously interact with the first and second optical beams 104 and 106. As shown, the number of channel ports is 16 and number of filters is 8.

The compactness of the WDM device 700 depends on internal spacing as well as the physical size of the filters 102 and ports 114-123 and 134-143. Internal spacing of the WDM device 700 is determined by a lateral distance $d_1$ between centerlines of adjacent ports receiving optical signals from the same optical beam. For example, with reference to FIG. 9A, the lateral distance $d_1$ is measured between centerlines of port 115 and port 117 (i.e., ch 1 and ch 3). This lateral distance $d_1$ includes physical space between the ports 115 and 117 including the port 135. Alternatively, the lateral distance $d_1$ may depend on the dimension of the filter 102 plus spacing between adjacent filters 102. The filters 102 may be larger in at least one dimension than a corresponding dimension of the filters 12 shown in FIGS. 1A, 1B, 2A, and 2B so that there is sufficient surface area for both the optical beams 104 and 106 to simultaneously impinge upon the filter 102 at an angle of incidence $\theta_i$. By way of example, the filters 102 may be twice as large in one dimension than filters 12 and so may be 2.5 mm to 3.5 mm long in one dimension. That dimension may be oriented parallel to the plane of the second layer 154. The values of $\theta_i$ and $d_1$ define the transverse distance $d_2$ between adjacent filters 102 in the optical beams 104, 106 according to the principles of trigonometry.

The internal values $d_1$, $d_2$, and $\theta_i$ and physical dimensions of the ports 114-123 and ports 134-143 with respect to the WDM device 700 of FIGS. 9A and 9B effect the outer dimensions of the device 700. In FIGS. 9A and 9B, the WDM device 700 has an angle of incidence $\theta_i$ of 4°. An exemplary lateral distance $d_1$ is 3.9 mm to allow sufficient spacing between adjacent ports 114-123 and 134-143 in their respective columns 166, 170 or to allow sufficient spacing between adjacent filters 102. An exemplary transverse distance $d_2$ is 27.5 mm. With each of $d_1$, $d_2$, and $\theta_i$ for the redundant 8-channel WDM device 700 shown in FIG. 9A, a length $L_9$ is 37 mm. A width $W_9$ is 18 mm. With reference specifically to FIG. 9B, a height $H_9$ of the WDM device 700 is 7 mm, which may be determined by the prisms 156. The dimensions of length $L_9$, $W_9$, and $H_9$ are summarized in one of the lines in Table 1 at the end of this section of the disclosure, and do not include a strain relief for the optical fibers 126, 130, and 132 or a housing for the WDM device 700, which will add a few millimeters in all directions.

While exemplary dimensions are provided for a redundant 8-channel device, the dimensions $L_9$ and $H_9$ remain substantially the same for devices having more or fewer channels than 8 channels. However, the width dimension $W_9$ will increase or decrease with an increase or decrease, respectively, in the number of channel ports of the device 700. Exemplary 12 and 24 channel device dimensions for a 3-layer alternative stacked arrangement (similar to the WDM device 700) are listed in Table 2 below. Thus, embodiments of the disclosure are not limited by the number of channel ports.

TABLE 1

| | | 8 Channel | | |
|---|---|---|---|---|
| | FIGS. | Length, L (mm) | Width, W (mm) | Height, H (mm) |
| nonredundant | | | | |
| 1-layer | 1A, 1B | 44 | 13 | 1.5 |
| 2-layer | 2A, 2B | 37 | 13 | 4 |
| Redundant | | | | |
| 1-layer alternating stacked | 3A, 3B | 55 | 18 | 1.5 |
| 2-layer alternating stacked | 4A, 4B | 48 | 18 | 4 |
| 2-layer side-by-side | 5A, 5B | 44 | 13 | 3.5 |
| 2-layer side-by-side counterpropagating | 6A, 6B | 44 | 13 | 3.5 |
| 4-layer side-by-side | 7A, 7B | 37 | 13 | 8 |
| 4-layer side-by-side counterpropagating | 8A, 8B | 37 | 15 | 8 |
| 3-layer alternating stacked | 9A, 9B | 37 | 18 | 7 |

TABLE 2

| | 12 Channel | | | 24 Channel | | |
|---|---|---|---|---|---|---|
| | Length (mm) | Width (mm) | Height (mm) | Length (mm) | Width (mm) | Height (mm) |
| Nonredundant | | | | | | |
| 1-layer | 45 | 18 | 1.5 | 46 | 33 | 1.5 |
| 2-layer | 38 | 18 | 4 | 39 | 33 | 4 |
| Redundant | | | | | | |
| 1-layer alternating stacked | 56 | 26 | 1.5 | 57 | 49 | 1.5 |
| 2-layer alternating stacked | 49 | 26 | 4 | 50 | 49 | 4 |
| 2-layer side-by-side | 45 | 18 | 3.5 | 46 | 33 | 3.5 |
| 2-layer side-by-side counterpropagating | 45 | 20 | 3.5 | 46 | 35 | 3.5 |
| 4-layer side-by-side | 40 | 18 | 8 | 41 | 33 | 8 |
| 4-layer side-by-side counterpropagating | 40 | 21 | 8 | 41 | 36 | 8 |

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A redundant wavelength division multiplexing (WDM) device comprising:
    a first common port including a collimator configured to transmit a first optical beam that includes a first plurality of optical signals;
    a second common port including a collimator configured to transmit a second optical beam that includes a second plurality of optical signals, the second common port being spaced apart from the first common port;
    a plurality of filters that define an optical path for each of the first optical beam and the second optical beam, wherein each filter is oriented to interact with each of the first optical beam and the second optical beam; and
    a plurality of first channel ports and a plurality of second channel ports, wherein each channel port includes a respective channel collimator,
    wherein a sum of a number of the first channel ports and a number of the second channel ports is equal to twice a number of the plurality of filters,
    wherein the first common port and the plurality of first channel ports define a first plane,
    wherein the second common port and the plurality of second channel ports define a second plane that is spaced apart from the first plane, and
    wherein one-half of the first channel ports forms a first column that defines a first plane, one-half of the second channel ports forms a second column that defines a second plane, one-half of the first channel ports forms a third column that defines a third plane, and one-half of the second channel ports forms a fourth column that defines a fourth plane,
    wherein the first plane, the second plane, the third plane, and the fourth plane are spaced apart from each other.

2. The redundant WDM device of claim 1, further comprising:
    a prism positioned optically between the first column and the third column, and between the second column and the fourth column.

3. The redundant WDM device of claim 1, wherein each filter of the plurality of filters has a longitudinal axis and that is perpendicular to each of the first plane, the second plane, the third plane, and the fourth plane.

* * * * *